(12) United States Patent
Vaslag

(10) Patent No.: US 11,359,365 B2
(45) Date of Patent: Jun. 14, 2022

(54) HEATING AND COOLING SYSTEM OF A MODULAR RESIDENTIAL BUILDING

(71) Applicant: Orient Holding AS, Bodø (NO)

(72) Inventor: Arne Vaslag, Melhus (NO)

(73) Assignee: ORIENT HOLDING AS, Bodø (NO)

( * ) Notice: Subject to any disclaimer, the term of this patent is extended or adjusted under 35 U.S.C. 154(b) by 0 days.

(21) Appl. No.: 15/772,613

(22) PCT Filed: Nov. 1, 2016

(86) PCT No.: PCT/NO2016/050216
§ 371 (c)(1),
(2) Date: May 1, 2018

(87) PCT Pub. No.: WO2017/078539
PCT Pub. Date: May 11, 2017

(65) Prior Publication Data
US 2019/0120507 A1    Apr. 25, 2019

(30) Foreign Application Priority Data
Nov. 2, 2015  (NO) .................................... 20151478

(51) Int. Cl.
*E04B 1/348* (2006.01)
*E04B 1/74* (2006.01)
*F24F 3/06* (2006.01)

(52) U.S. Cl.
CPC ............ *E04B 1/34807* (2013.01); *E04B 1/74* (2013.01); *F24F 3/06* (2013.01)

(58) Field of Classification Search
CPC ............. E04B 1/34807; E04B 1/34869; E04B 1/3483; E04B 1/348; E04B 1/34861;
(Continued)

(56) References Cited

U.S. PATENT DOCUMENTS 2,014,087 A * 9/1935 Mopin ...................... E04B 1/30
52/236.3
2,499,498 A * 3/1950 Hammond, Jr. .... E04B 1/34807
52/67
(Continued)

FOREIGN PATENT DOCUMENTS

CA     1 156 015     11/1983
CN      1355359      6/2002
(Continued)

OTHER PUBLICATIONS

Definition of container by Dictionary.com at: https://www.dictionary.com/browse/container?s=t.*
(Continued)

*Primary Examiner* — Kyle J. Walraed-Sullivan
(74) *Attorney, Agent, or Firm* — Wenderoth, Lind & Ponack, L.L.P.

(57) ABSTRACT

The present invention discloses a heating and cooling system of a modular residential building at least comprising: a) a building framework, b) a number of flat modules (1.0), c) a number of front elements (6.04), d) at least two gable elements (6.03), e) at least one roof element (6.02), and f) a plurality of horizontal and vertical heating and cooling canals, where the building frameworks includes fastening means (5.02) for securing the flat modules (1.0) to the building framework with a horizontal and vertical distance between neighbouring flat modules (1.0) thereby creating cavities there between where cavities are utilized as the plurality of horizontal and vertical heating and cooling canals.

17 Claims, 22 Drawing Sheets

(58) Field of Classification Search
CPC ........ E04B 1/74; E04B 1/8209; E04B 1/8404; E04B 1/8409; E04B 1/84; E04B 2001/8254; E04H 1/005; E04H 1/04; E04H 2001/1283; B65D 88/022
See application file for complete search history.

(56) References Cited

U.S. PATENT DOCUMENTS

| | | | | |
|---|---|---|---|---|
| 3,229,431 | A * | 1/1966 | Paul | E04B 1/3483 52/79.13 |
| 3,377,755 | A * | 4/1968 | Meuli | E04B 1/04 52/79.13 |
| 3,430,398 | A * | 3/1969 | Green | E04B 1/34861 52/79.2 |
| 3,500,595 | A * | 3/1970 | Bennett | E04C 3/30 52/79.13 |
| 3,514,910 | A * | 6/1970 | Comm | E04B 1/34807 52/79.11 |
| 3,540,173 | A * | 11/1970 | Johnides | E04B 1/348 52/79.5 |
| 3,613,321 | A * | 10/1971 | Rohrer | E04B 1/34807 52/73 |
| 3,623,296 | A * | 11/1971 | Santoro | E04B 1/34807 52/79.12 |
| 3,638,380 | A * | 2/1972 | Perri | E04B 1/34807 52/79.12 |
| 3,721,056 | A * | 3/1973 | Toan | E04B 1/34807 52/236.6 |
| 3,722,168 | A * | 3/1973 | Comm | E04B 1/34807 52/745.03 |
| 3,752,511 | A * | 8/1973 | Racy | B65D 90/0013 24/287 |
| 3,758,998 | A * | 9/1973 | Ollis | E04B 1/34807 52/79.13 |
| 3,866,672 | A * | 2/1975 | Rich, Jr | F24F 3/044 165/50 |
| RE28,367 | E * | 3/1975 | Rich | E04B 1/34807 52/79.11 |
| 3,903,664 | A * | 9/1975 | Doriel | E04B 1/30 52/79.12 |
| 4,048,769 | A * | 9/1977 | van der Lely | E04B 1/34823 52/79.7 |
| 4,059,931 | A * | 11/1977 | Mongan | E04B 1/22 52/223.5 |
| 4,107,886 | A * | 8/1978 | Ray | E04B 1/162 52/431 |
| 4,186,539 | A | 2/1980 | Harmon et al. | |
| 4,525,975 | A * | 7/1985 | McWethy | E04B 1/34823 52/234 |
| 4,592,175 | A * | 6/1986 | Werner | E04H 1/04 52/79.9 |
| 4,599,829 | A * | 7/1986 | DiMartino, Sr. | E04B 1/3483 410/79 |
| 4,723,381 | A * | 2/1988 | Straumsnes | E04B 1/34807 52/745.02 |
| 5,528,866 | A * | 6/1996 | Yulkowski | E04H 1/04 52/79.12 |
| 5,706,614 | A * | 1/1998 | Wiley, Jr. | E04B 1/3483 52/537 |
| 5,761,854 | A * | 6/1998 | Johnson | B60P 3/34 135/116 |
| 6,826,879 | B1 * | 12/2004 | Allen | E04B 1/34815 52/143 |
| 6,925,761 | B1 * | 8/2005 | De La Marche | E04B 1/34815 52/220.1 |
| 7,784,224 | B2 * | 8/2010 | Peckham | E04H 1/04 52/106 |
| 8,166,714 | B2 * | 5/2012 | Ziegelman | E04H 1/005 52/79.2 |
| 8,186,109 | B2 * | 5/2012 | Warminsky | E04B 9/10 52/79.1 |
| 8,484,929 | B1 * | 7/2013 | Begdouri | E02D 29/045 52/745.03 |
| 8,769,886 | B2 * | 7/2014 | Ohnishi | E04B 1/3483 52/125.2 |
| 9,441,359 | B1 * | 9/2016 | Hsieh | E04B 1/24 |
| 10,196,209 | B2 * | 2/2019 | Lindbo | B65G 57/03 |
| 10,208,475 | B2 * | 2/2019 | Heather | B65D 90/0026 |
| 10,526,781 | B2 * | 1/2020 | Lestini | E04B 1/1912 |
| 2003/0101680 | A1 * | 6/2003 | Lee | E04H 1/04 52/745.2 |
| 2003/0167714 | A1 | 9/2003 | Jandl | |
| 2005/0028966 | A1 | 2/2005 | Pickard | |
| 2005/0210762 | A1 * | 9/2005 | Broberg | E04B 1/34807 52/79.1 |
| 2006/0059792 | A1 * | 3/2006 | Tiramani | E04H 1/04 52/79.1 |
| 2006/0101727 | A1 * | 5/2006 | Holgerson | G09B 19/00 52/79.1 |
| 2006/0185262 | A1 * | 8/2006 | Abler | E04B 1/3442 52/64 |
| 2007/0271857 | A1 * | 11/2007 | Heather | B65D 88/005 52/79.9 |
| 2008/0134589 | A1 * | 6/2008 | Abrams | E04B 1/34384 52/79.1 |
| 2009/0307994 | A1 * | 12/2009 | Cathcart | E04C 2/246 52/79.9 |
| 2010/0058675 | A1 * | 3/2010 | Simmons | E04B 1/34807 52/79.1 |
| 2010/0071872 | A1 | 3/2010 | Fischer | |
| 2011/0056147 | A1 * | 3/2011 | Beaudet | E04B 1/34869 52/79.9 |
| 2011/0162293 | A1 * | 7/2011 | Levy | E04B 1/3483 52/79.9 |
| 2011/0173907 | A1 * | 7/2011 | Katsalidis | E04B 1/3483 52/236.3 |
| 2011/0240497 | A1 * | 10/2011 | Dechene | H05K 7/1497 206/320 |
| 2012/0266546 | A1 * | 10/2012 | Gyory | E04B 1/3444 52/126.1 |
| 2013/0067832 | A1 * | 3/2013 | Collins | E04B 1/24 52/125.1 |
| 2013/0152485 | A1 * | 6/2013 | Austin | E04B 1/348 52/79.8 |
| 2013/0160379 | A1 * | 6/2013 | Balfantz, III | E04H 1/005 52/79.1 |
| 2013/0305629 | A1 * | 11/2013 | Stephenson | E04B 1/3483 52/79.9 |
| 2014/0223840 | A1 * | 8/2014 | Wheeler | E04B 1/3483 52/79.9 |
| 2014/0298734 | A1 * | 10/2014 | Rogers | E04B 1/343 52/79.9 |
| 2014/0298745 | A1 * | 10/2014 | Rechenmacher | E04B 1/161 52/425 |
| 2014/0318036 | A1 * | 10/2014 | Eom | E04H 1/04 52/79.1 |
| 2014/0352232 | A1 * | 12/2014 | Malakauskas | E04H 1/005 52/79.9 |
| 2015/0152634 | A1 * | 6/2015 | Unger | E04B 5/10 52/79.2 |
| 2015/0266616 | A1 * | 9/2015 | Barrable | B65D 88/022 206/512 |
| 2016/0040443 | A1 * | 2/2016 | Stephenson | E04H 1/005 52/79.5 |
| 2016/0130795 | A1 * | 5/2016 | Downey | E04B 1/34823 52/79.1 |
| 2016/0138260 | A1 * | 5/2016 | Matoric | H05K 7/20781 52/79.1 |
| 2016/0160515 | A1 * | 6/2016 | Wallance | E04B 1/3483 52/79.1 |
| 2016/0312485 | A1 * | 10/2016 | Wilson | E04B 2/721 |
| 2017/0002579 | A1 * | 1/2017 | French | E04H 1/04 |
| 2017/0167128 | A1 * | 6/2017 | Bouveng | E04B 1/34807 |
| 2017/0191515 | A1 * | 7/2017 | Kwon | F16B 7/185 |
| 2017/0370113 | A1 * | 12/2017 | Nyce | E04G 21/163 |
| 2018/0051459 | A1 * | 2/2018 | Clarke | B65G 1/0478 |
| 2018/0106030 | A1 * | 4/2018 | Ledoux | E04B 1/3483 |

(56) References Cited

U.S. PATENT DOCUMENTS

| | | | |
|---|---|---|---|
| 2018/0230691 A1* | 8/2018 | Tsai | E04B 1/3442 |
| 2018/0273288 A1* | 9/2018 | Brennan, Jr. | E04B 2/62 |
| 2018/0328019 A1* | 11/2018 | Collins | E04B 1/40 |
| 2019/0032327 A1* | 1/2019 | Musson | E04B 1/34807 |
| 2019/0120507 A1* | 4/2019 | Vaslag | E04B 1/74 |
| 2019/0136553 A1* | 5/2019 | Geiger | E04H 3/08 |
| 2019/0153720 A1* | 5/2019 | Bon | E04B 1/3483 |
| 2019/0217929 A1* | 7/2019 | Lefevre | E04B 1/34336 |
| 2019/0257073 A1* | 8/2019 | Ledoux | E04B 1/3483 |

FOREIGN PATENT DOCUMENTS

| | | |
|---|---|---|
| EP | 2 253 776 | 11/2010 |
| FR | 984.959 | 7/1951 |
| GB | 1 314 948 | 4/1973 |
| JP | 51-030365 | 8/1976 |
| JP | 53-020774 | 6/1978 |
| JP | 2009-155814 | 7/2009 |
| JP | 2014-051874 | 3/2014 |
| RU | 2 287 643 | 11/2006 |
| RU | 2 312 191 | 12/2007 |
| RU | 2 487 223 | 7/2013 |

OTHER PUBLICATIONS

International Search Report dated Feb. 13, 2017 in corresponding International Application No. PCT/NO2016/050216.
Norwegian Search Report dated Jun. 2, 2016 in corresponding Norwegian Application No. 20151478.
Translation of Decision to Grant dated Mar. 23, 2020 in Russian Patent Application No. 2018119293.
Search Report dated Mar. 23, 2020 in Russian Patent Application No. 2018119293.

* cited by examiner

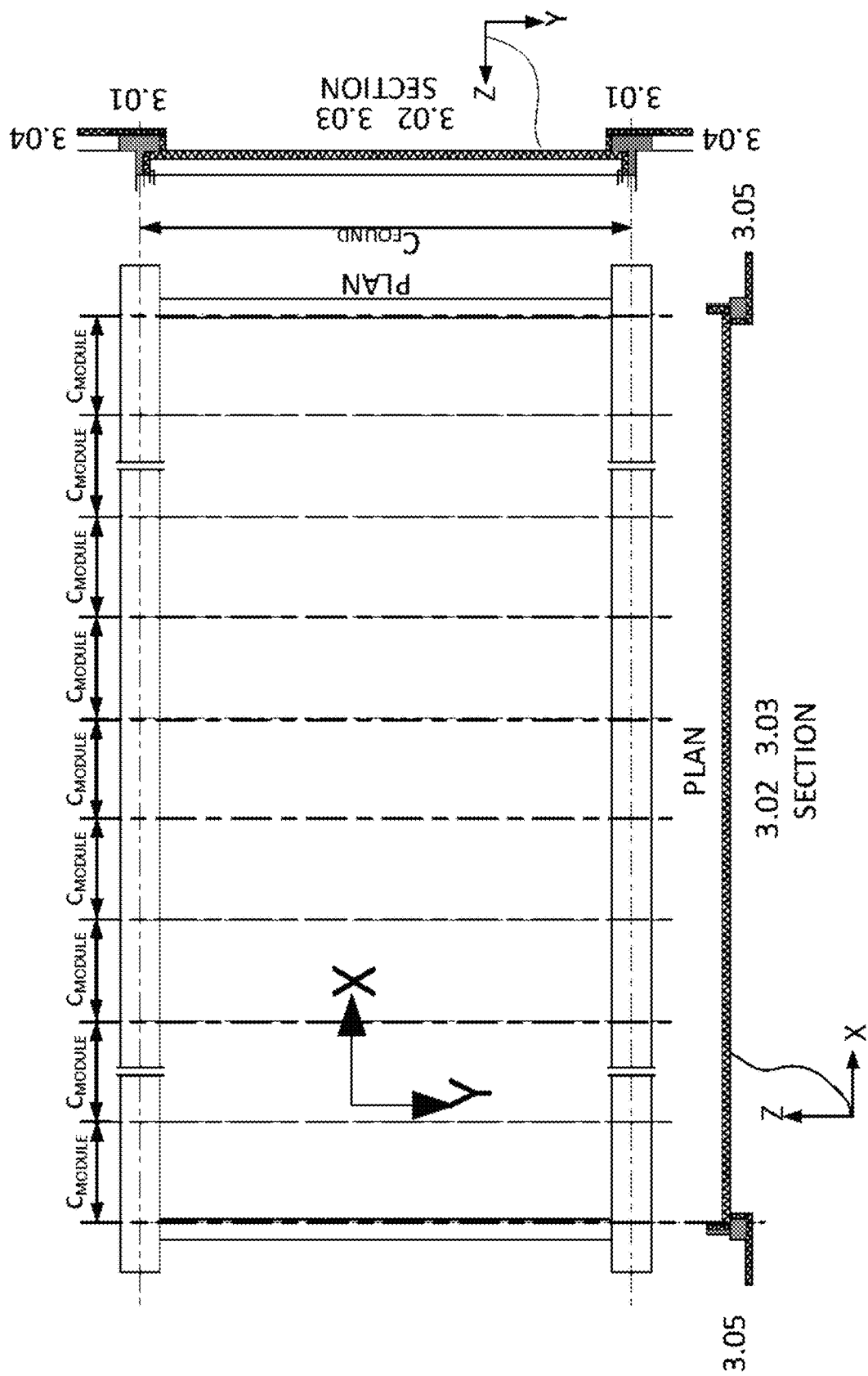

HEATING AND COOLING SYSTEM OF A MODULAR RESIDENTIAL BUILDING

TECHNICAL FIELD

The present invention relates to a smart house, and more particular to a modular smart house comprising building modules.

BACKGROUND ART

There is a need to be able to build residential buildings in an efficient manner which meets standards for residential buildings. Moreover it is a need to be able to raise residential buildings that are easily scalable when it comes to size.

Barracks is the normal answer to the needs addressed above. However, barracks has some shortcomings and in particular so when it comes to heating, ventilation and sewerage systems.

It is an object of the present invention to overcome the drawbacks related to possible erroneous registration of goods.

DISCLOSURE OF INVENTION

It is one object of the invention to provide a technical solution to the problem above by providing a heating and cooling system of a modular residential building at least comprising:
a) a building framework,
b) a number of flat modules,
c) a number of front elements,
d) at least two gable elements,
e) at least one roof element, and
f) a plurality of horizontal and vertical heating and cooling canals,
where the building frameworks includes fastening means for securing the flat modules to the building framework with a horizontal and vertical distance between neighbouring flat modules thereby creating cavities there between where cavities are utilized as the plurality of horizontal and vertical heating and cooling canals.

In accordance with one aspect of the invention the modular residential building further comprises at least one technical room. The at least one technical room can be arranged in the middle of the modular residential building on the ground floor. Furthermore the technical room may at least comprise one of a fan, a dehumidifier (heat pump) and a reheating battery.

Other advantageous features will be apparent from the accompanying claims.

BRIEF DESCRIPTION OF DRAWINGS

Following is a brief description of the drawings in order to make the invention more readily understandable, the discussion that follows will refer to the accompanying drawings, in which FIG. 3 shows an example of a foundation layout for a modular residential building seen in the Z-direction, the foundations are shown in Y direction seen from the side and in the X-direction seen from the gable side of the modular residential building.

MODE(S) FOR CARRYING OUT THE INVENTION

Figure 1A:
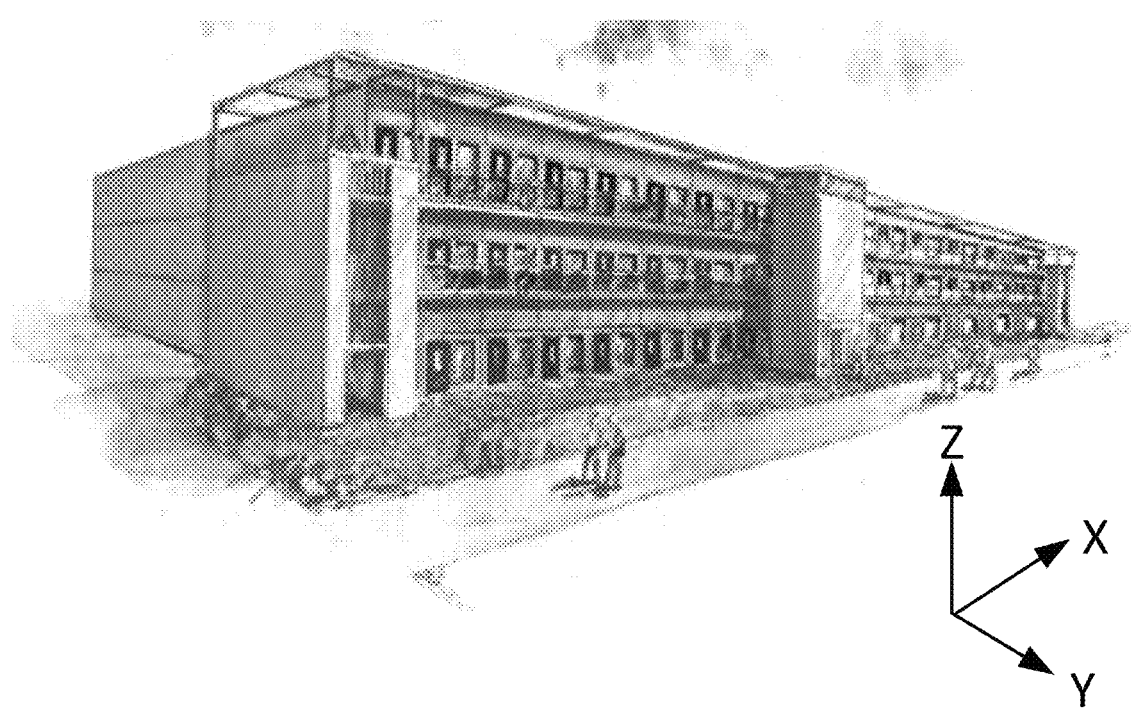
FIG. 1a shows a sketch of a modular residential building, comprising a plurality of flat modules.

In the following it is firstly disclosed general embodiments in accordance to the present invention, thereafter particular exemplary embodiments will be described. Where possible reference will be made to the accompanying drawings and where possible using reference numerals in the drawings. It shall be noted however that the drawings are exemplary embodiments only and other features and embodiments may well be within the scope of the invention as described.

According to the present invention it is provided a cellular house comprising building modules within an isolated outer framework/outer shell. At least some of the building modules are fully functional living units. In between the building modules and the outer shell it is vertical and horizontal hollow rooms—openings. The building modules can be provided as standardised standalone units with a minimum of necessary connections to a common supply system for technical facilities.

In principle it is according to the invention provided a modular residential building comprising a framework and a set of flat modules adapted to fit into the framework. The flat modules may be provided with protruding blocks on each of its eight corners thereby providing for a distance between the framework and the main part of the flat modules and between neighbouring flat modules. The protruding block may serve as connection points/securing points between flat modules and the framework. The assembly of framework and flat modules are covered with an insulating layer/shell, thereby providing and interior canal system of the modular residential building. The canals appears as the distance between neighbouring flat modules in vertical and horizontal directions.

Moreover in one aspect it is an object of the invention that all modules have the same outside measures i.e. same width, height and depth. This facilitates assembly of the modular residential building as well as it makes for a rational and efficient construction of the framework for the modular residential building.

Heating

To facilitate installation of the heating system for the cellular house, the openings between the outer shell and the building modules shall be provided with approximately the same temperature everywhere or almost everywhere. In one embodiment the temperature is between 10 and 20° C. and in an aspect of the embodiment the temperature is set between 18-19° C. throughout the heating season, consequently the need for individual heating of each building module is very limited. Furthermore during summer season the forced air circulating in the interior canals of the modular residential building may have a temperature that is lower than the outdoor temperature thereby reducing inside temperature in the flat modules or reducing the need for cooling down inside temperature in the flat modules.

It shall be appreciated that the present solution is not sensitive to the temperature of each individual flat module as opposed what is normal for blocks of flats. IN a block of flats living units has a limited number of walls facing out, the walls that are chared with neighbours reduces the need for heating/cooling. Obviously if one or more flats are temporarily or constant uninhabited this will affect the need for energy supply for heating or cooling the neighbouring flats, this will not be the case in the modular residential building according to the present invention due to a large extent to the interior canals having air streams with adapted temperature circulating behind the outer shell of the modular residential building.

Estimations have shown that with an outdoor temperature of −20° C. and with U-values as indicated in the table below for a building module of approximately 25 m² with a ceiling height 2.35 m the power consumption will be approximately 235 W with an indoor temperature of +21° C. for each individual building module.

To keep temperature at constant or nearly constant temperature in the cavity between the outer shell and the building modules canals are provided below the ground floor. The canals can originate from a technical room arranged in the middle of the building on the ground floor and they can be terminated at the end wall. The canals serves as distribution canals for air. Venting can be provided for at the technical room by canals arranged between the technical room and a ceiling void at the top of the residential building.

Figure 1B:
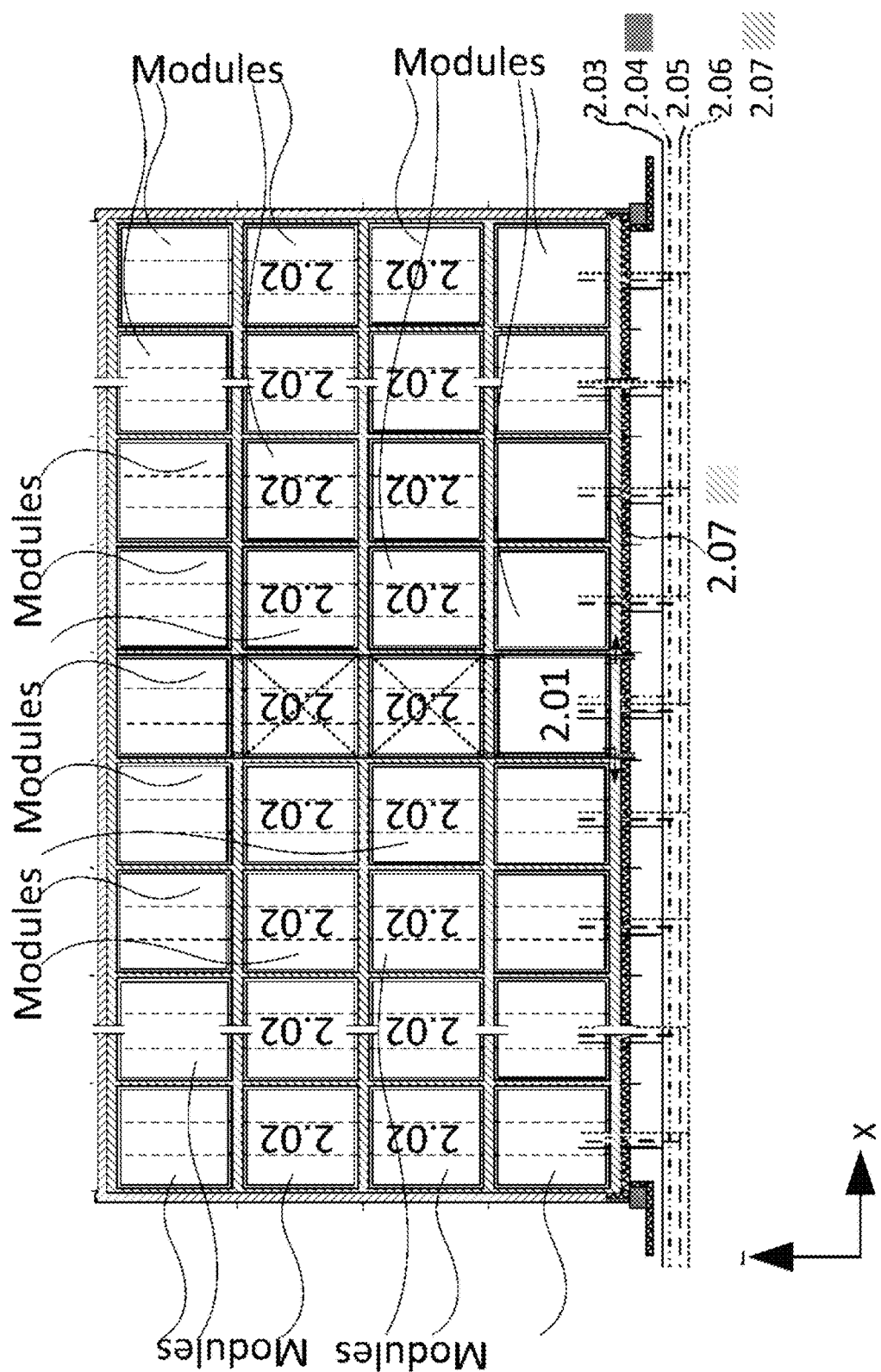
FIG. 1b shows a technical overview of a modular residential building seen in side view in an Y-direction.

In FIG. 1*b* it is indicated a "central" in and out of the central it is shown arrows indicating direction of air streams. To improve fire safety extract fire dampers and/or supply fire dampers is provided at the inlet and or air outlet from the central indicated by said arrows.

A fan and a dehumidifier (heat pump) and a reheating battery can be installed in the technical room. The fan, dehumidifier, and the reheating battery can be based on distant heating or air/water heater pump and electric boiler. This will minimise direct acting electricity for heating. The solution may also facilitate that electrical after heater battery can be used by the ventilation plant whilst simultaneously keeping the cavities dry.

Ventilation

Each individual module can be provided with its own generator with balanced ventilation. The generator may have a rotating heat recovery unit and a filter of F7 class.

The generator can be combined/be arranged together with a kitchen ventilator. When the kitchen ventilator is used the vented air will bypass the heat recover to reduce fouling. The generator has its air inlet on the façade of each individual module and the extract air is canalised upward above the roof top in a separate canal.

Alternatively air inlet can be provided at front side and extract air outlet can be provided at the back side of the modular residential building or vice versa. In one alternative embodiment the air inlet is at bottom of the building and air is extracted over the roof of the modular residential building.

The amount of air for each flat/module is determined by the need in the kitchen and in the bathroom. Typically a maximum air volume with forced ventilation in kitchen and bathroom can be 216 m³/h. To cover heat requirement for a flat/module an after heater battery in the ventilation plant can be used or a heater such as an electric radiator can be used.

A Detailed Description of the Accompanying Drawings

In the following a first embodiment of a modular residential building is described with support in the accompanying figures.

Figure 2A:
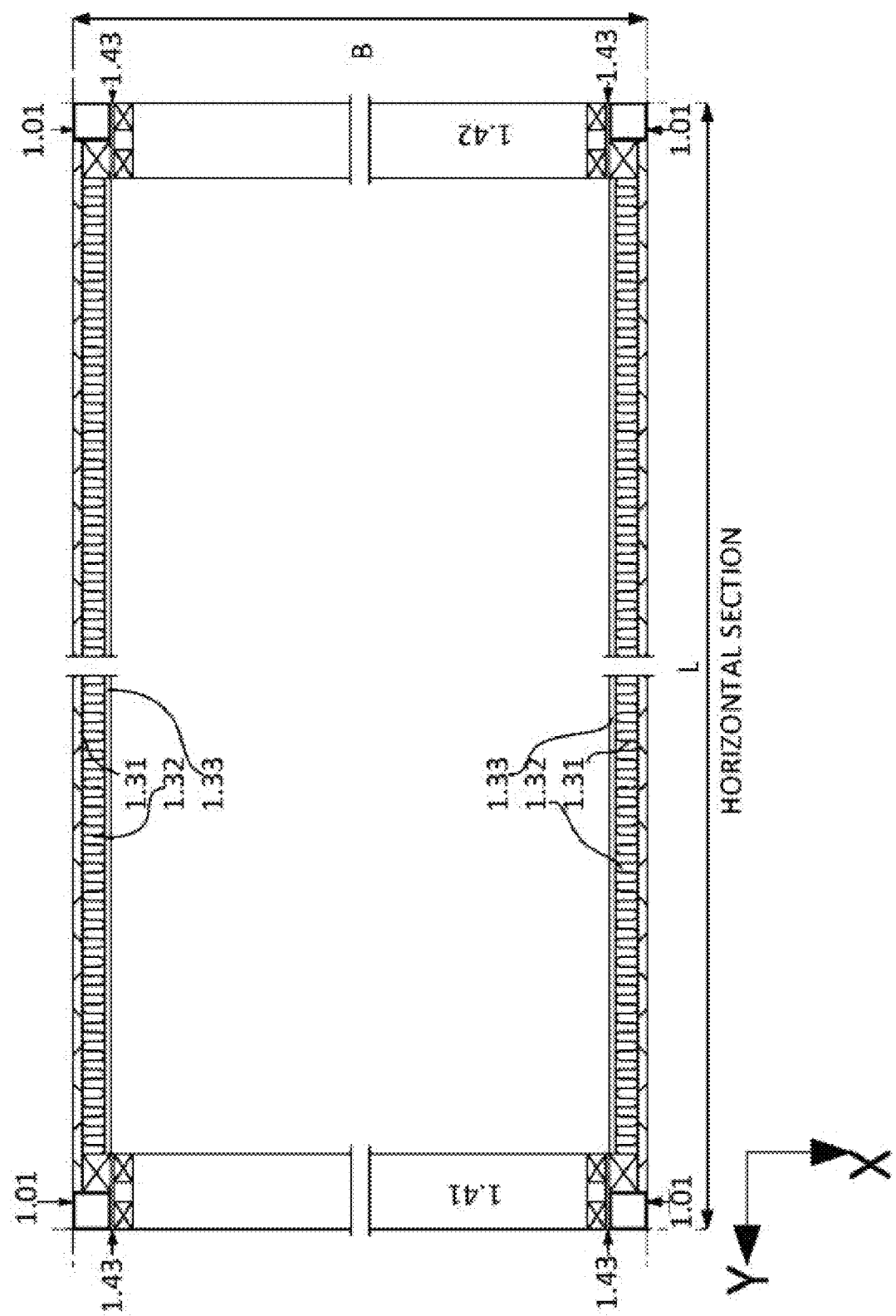
FIG. 2a shows a flat module seen from above, i.e. in the Z-direction.
Figure 2B:
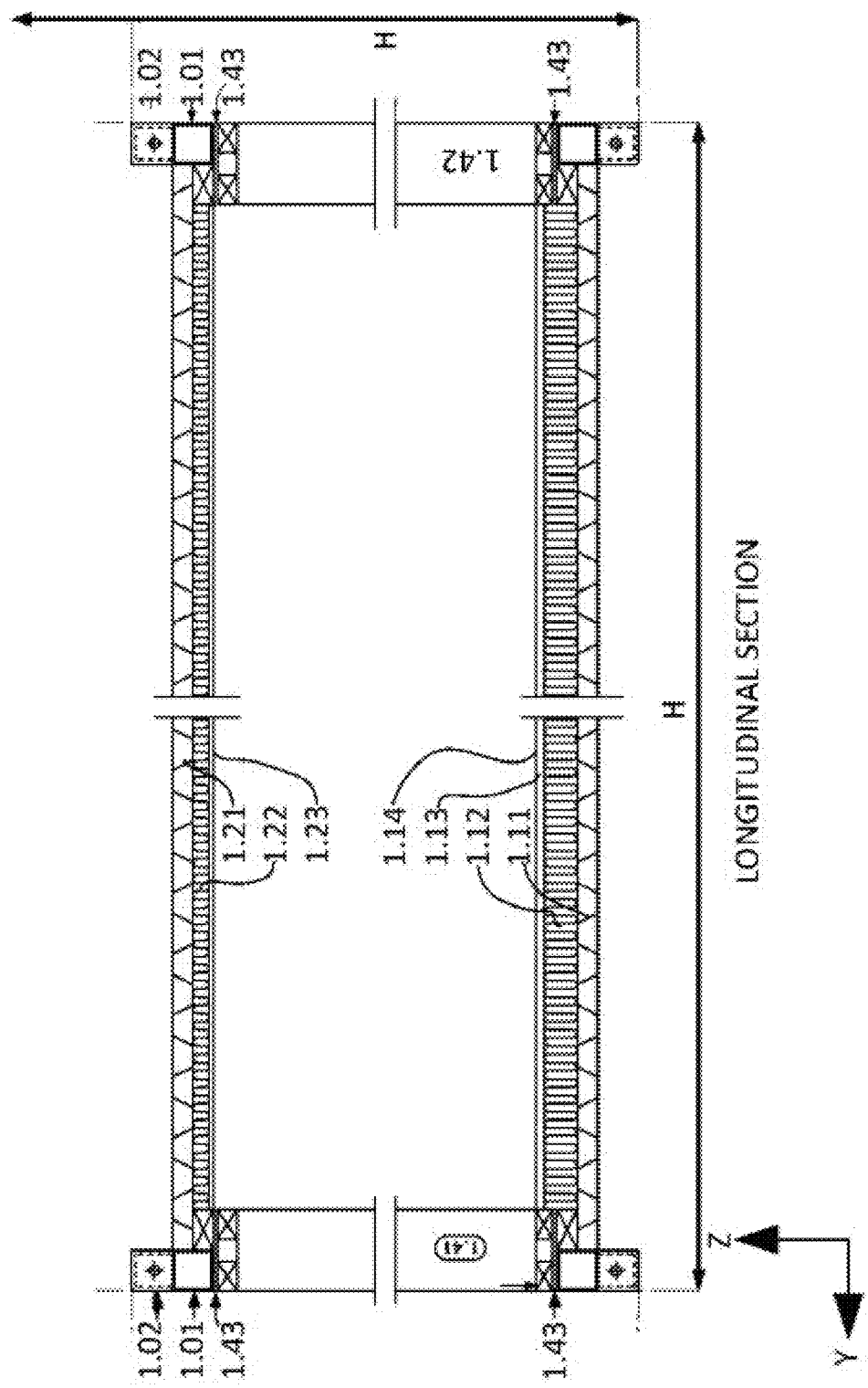
FIG. 2b shows a flat module seen in side view from the X-direction.
Figure 2C:
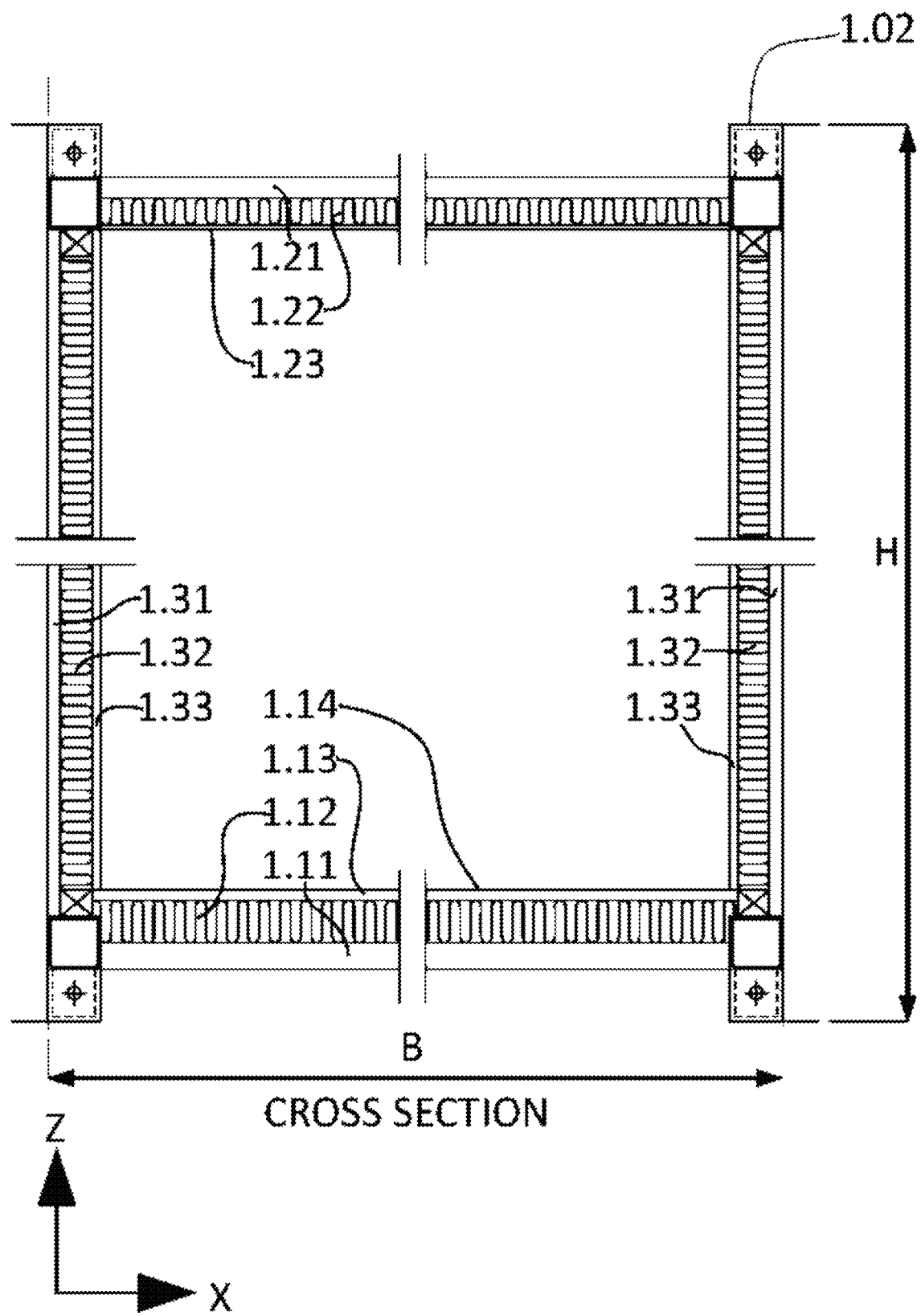
FIG. 2c shows a cross section of a flat module seen in Y-direction
Figure 4A:
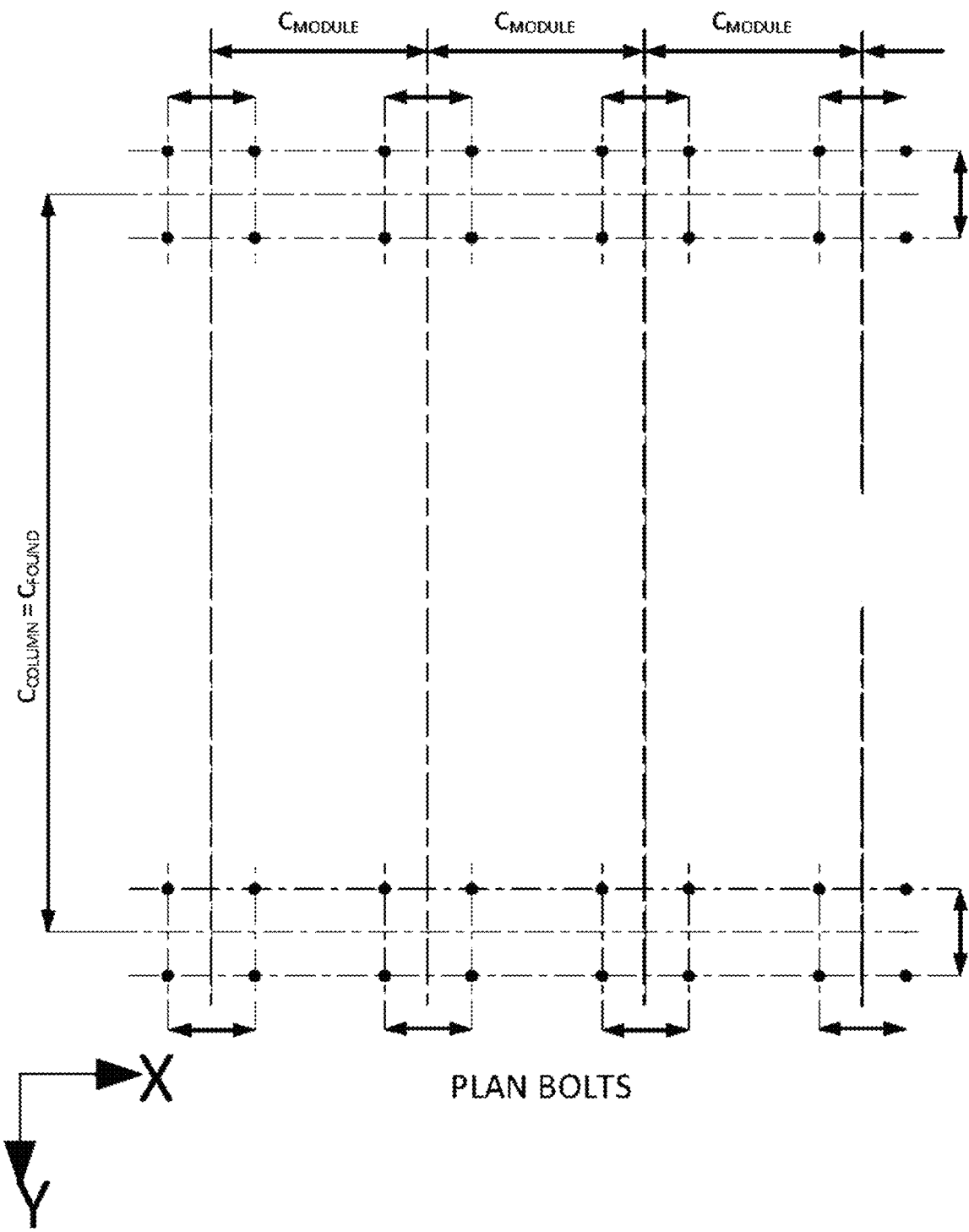
FIG. 4a shows an example of a foundation bolt configuration seen in the Z-direction.
Figure 4B:
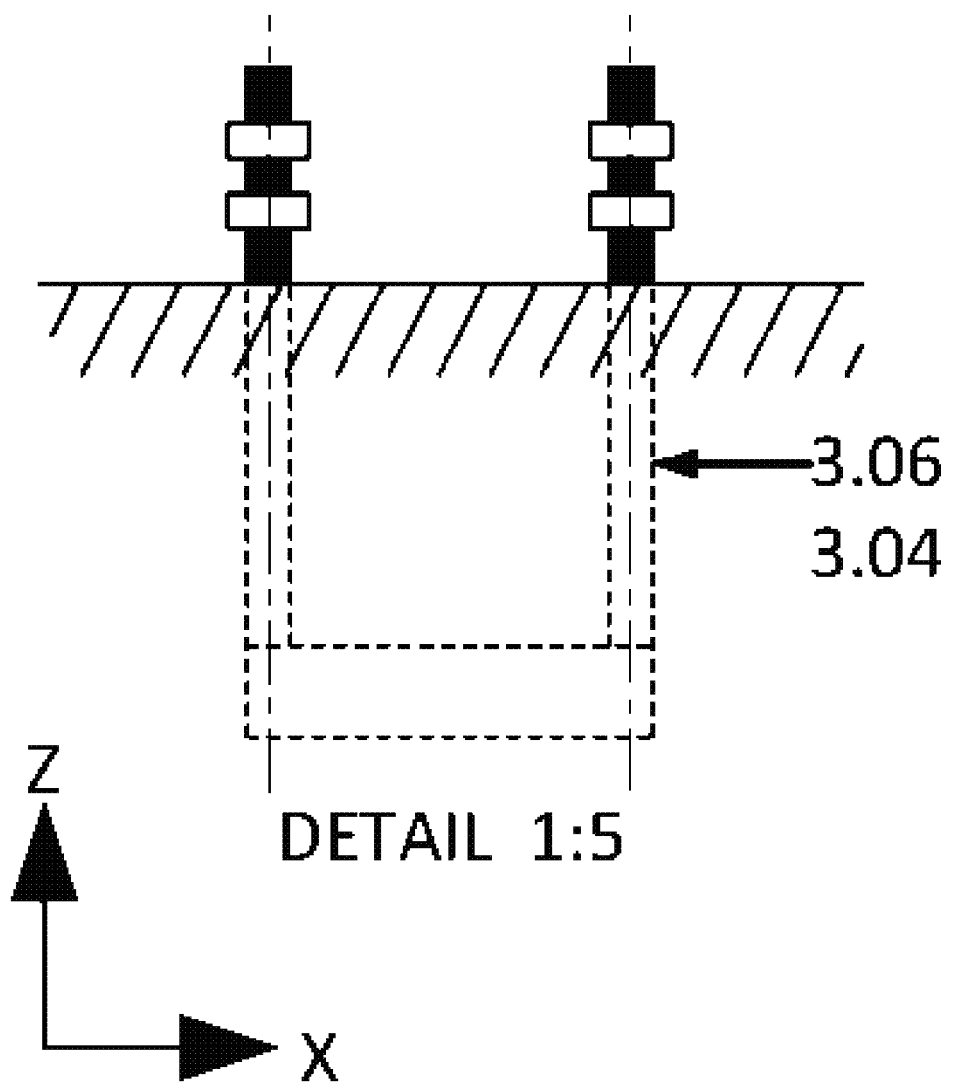
FIG. 4b shows a foundation bolt group in detail.

The figures can be divided into groups as follows:
a. FIGS. 2*a*, 2*b* and 2*c*: the flat module and its elements,
b. FIG. 1*b*: technical facilities,
c. FIGS. 3, 4*a* and 4*b*: the foundation of the modular residential building,
d. FIGS. 5, 6*a*, 6*b* and 7: structure,
e. FIG. 8, 9, 10*a*, 10*b*: assembly, and
f. FIGS. 11, 12*a*, 12*b*, 12*c* and 13: insulation.

Each group will be described separately with reference to the relevant figures.

Figure 5:
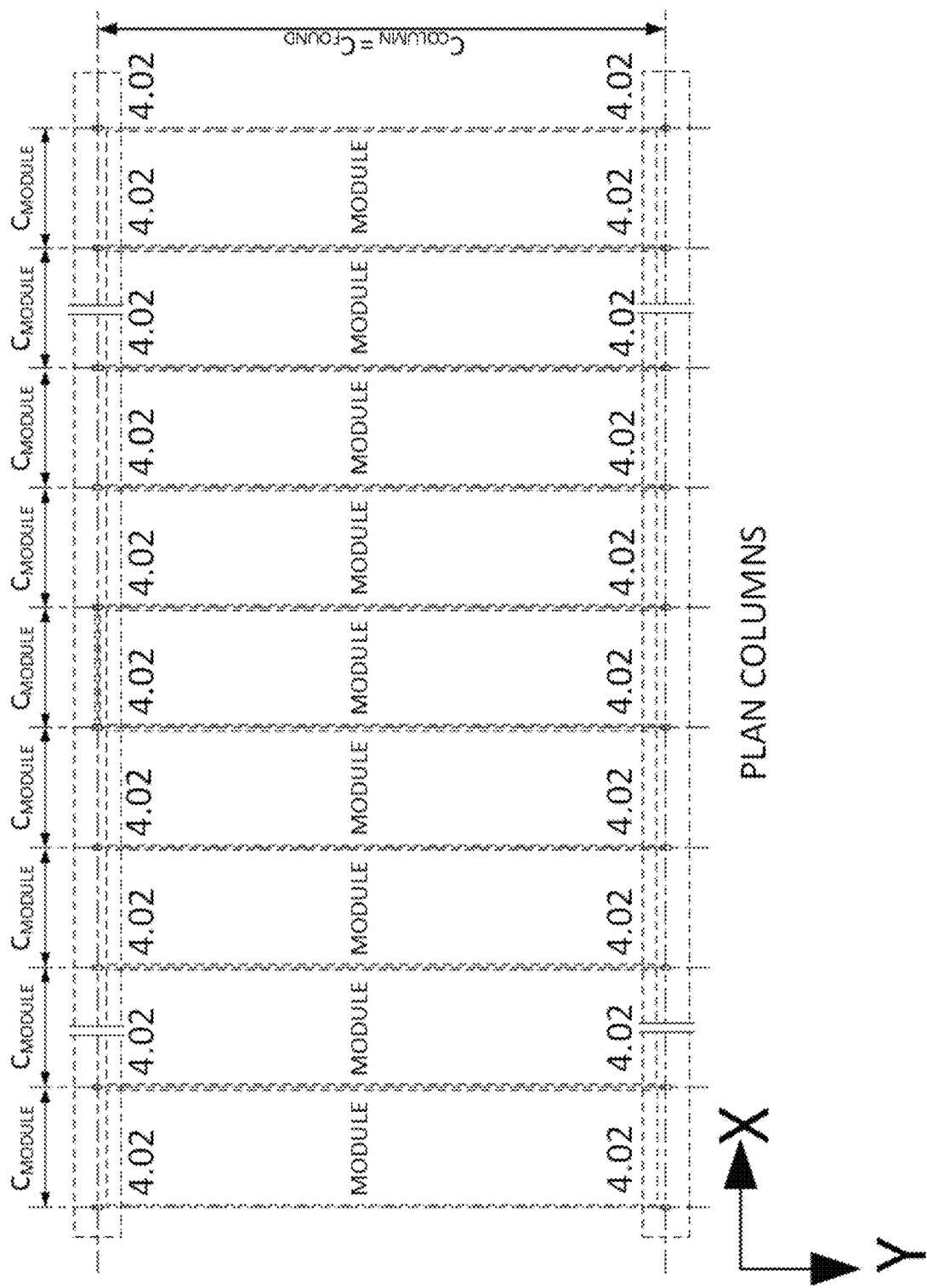
FIG. 5 shows structure of vertical columns seen in the Z-direction.
Figure 6A:
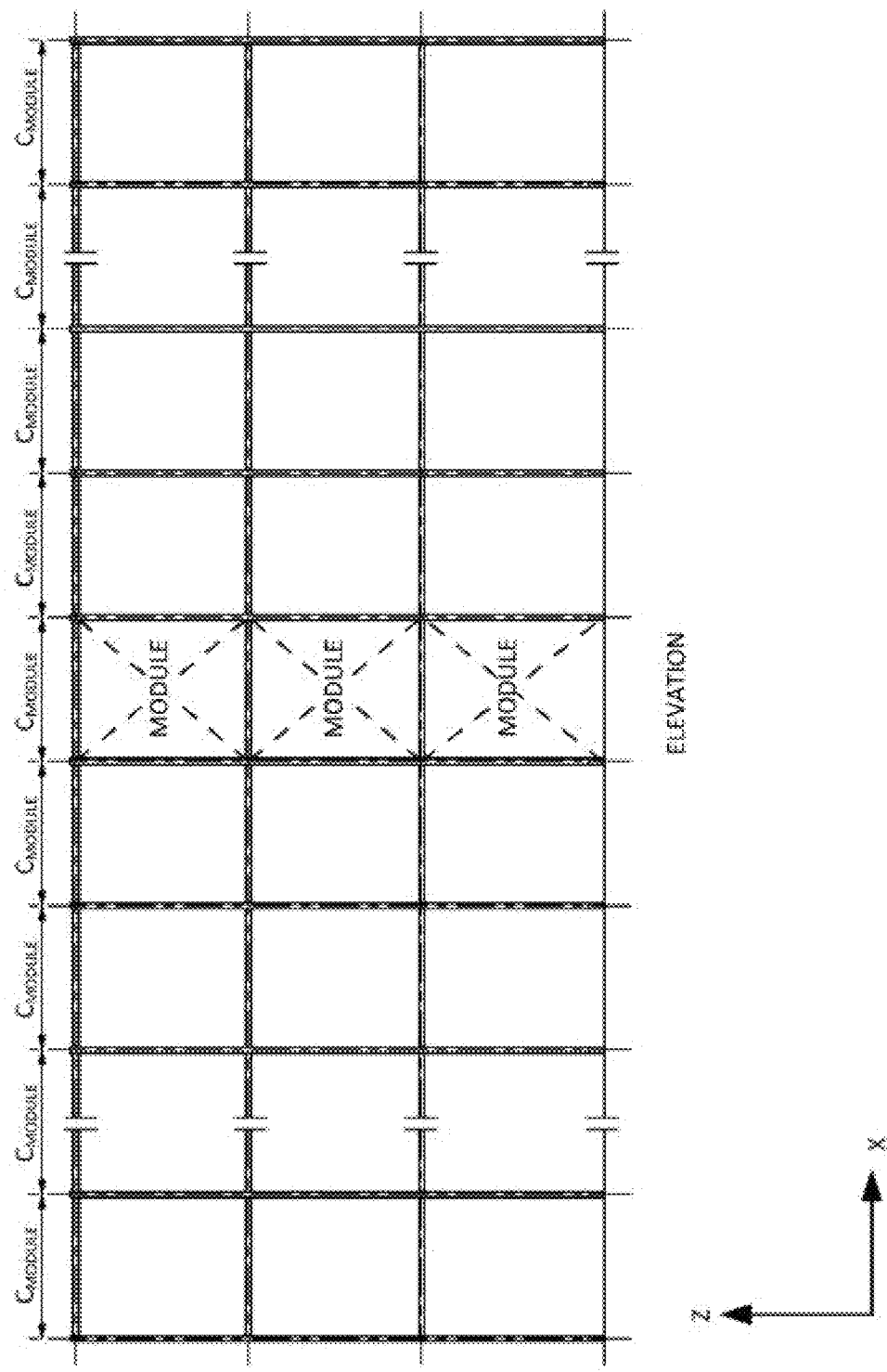
FIG. 6a shows structure framework seen in side view, in the Y-direction
Figure 6B:
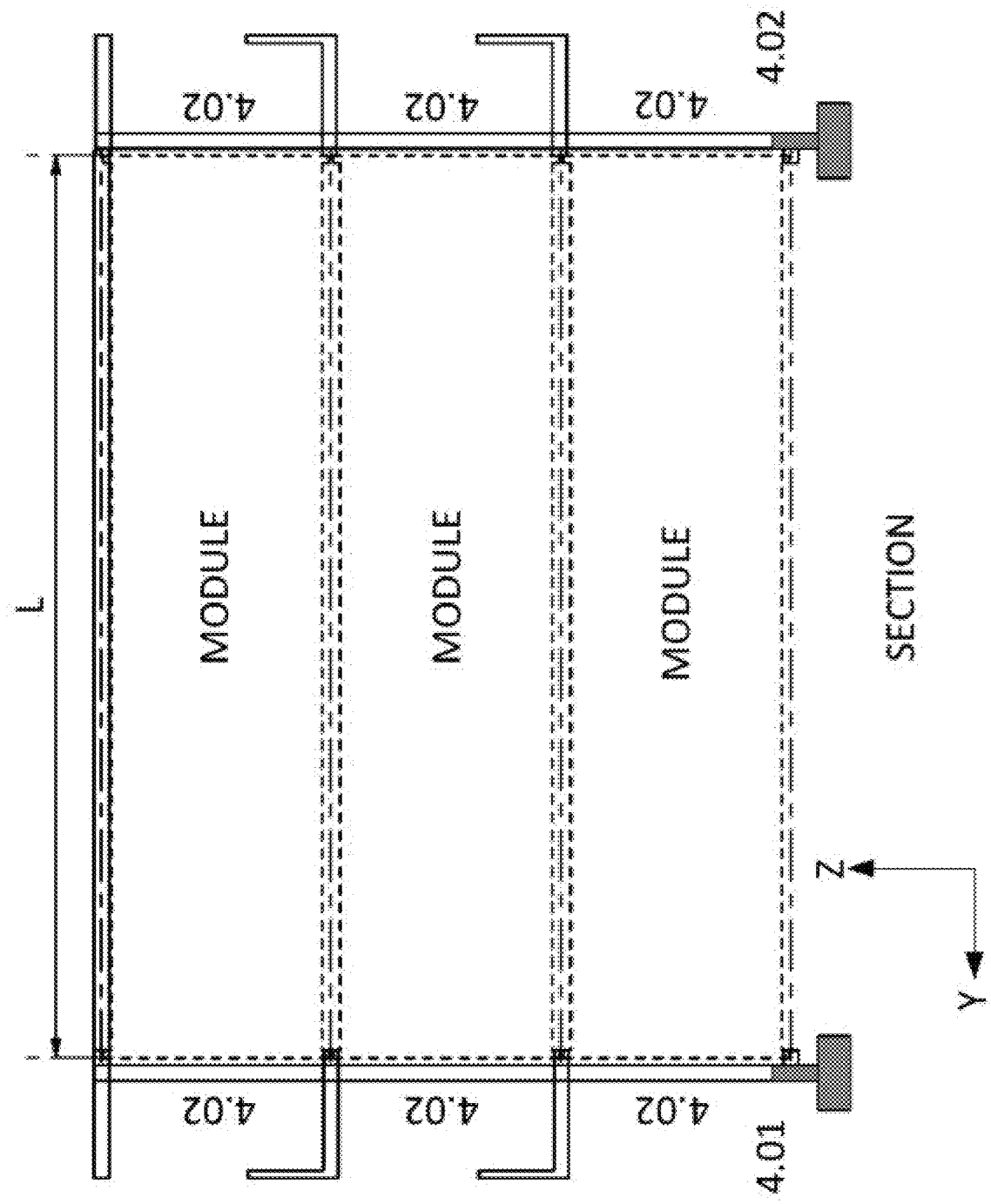
FIG. 6b shows a framework seen from the end gable side, i.e. in the X-direction.

Structure:

FIG. 5 shows the framework of the modular residential building seen from above. Numerous vertical columns are indicated as 4.02. FIG. 6*a* shows the structure of the framework seen in the Y-direction. The vertical columns 4.02 can be seen as upright poles in the Z-direction of the figure. In the middle it is shown a central module 2.01, indicated with a dotted cross. The figure shows a three floor tall modular residential building. However the number of floors are dependent on the height of the vertical columns, whilst the number of flat modules 1.0 in one floor is dependent on the number of vertical columns 4.02. FIG. 6*b* shows the framework/structure of the modular residential building seen in the X-direction and in a cross sectional view. The vertical columns shown as two rows of columns 4.02. At its bottom the columns 4.02 are anchored 4.01 to a foundation, at the top a beam stretches in the Y-direction. At each floor except the ground floor it is shown an L-shaped structure which protrudes out from the vertical columns 4.02. The horizontal part of the L-shaped protruding beam works as the basis for a horizontal gallery which is the outside entrance area for the flat modules, the vertical part of the L-shaped structure is the support frame for the railing along the galleries. In FIG. 6*b* it is shown galleries on the back and front side of the modular residential building, however it is possible to provide the building with galleries on one side only. Moreover galleries may be provided for only some of the floors above the ground floor. The dimension "L" indicates the length of a flat module 1.0.

Figure 7:
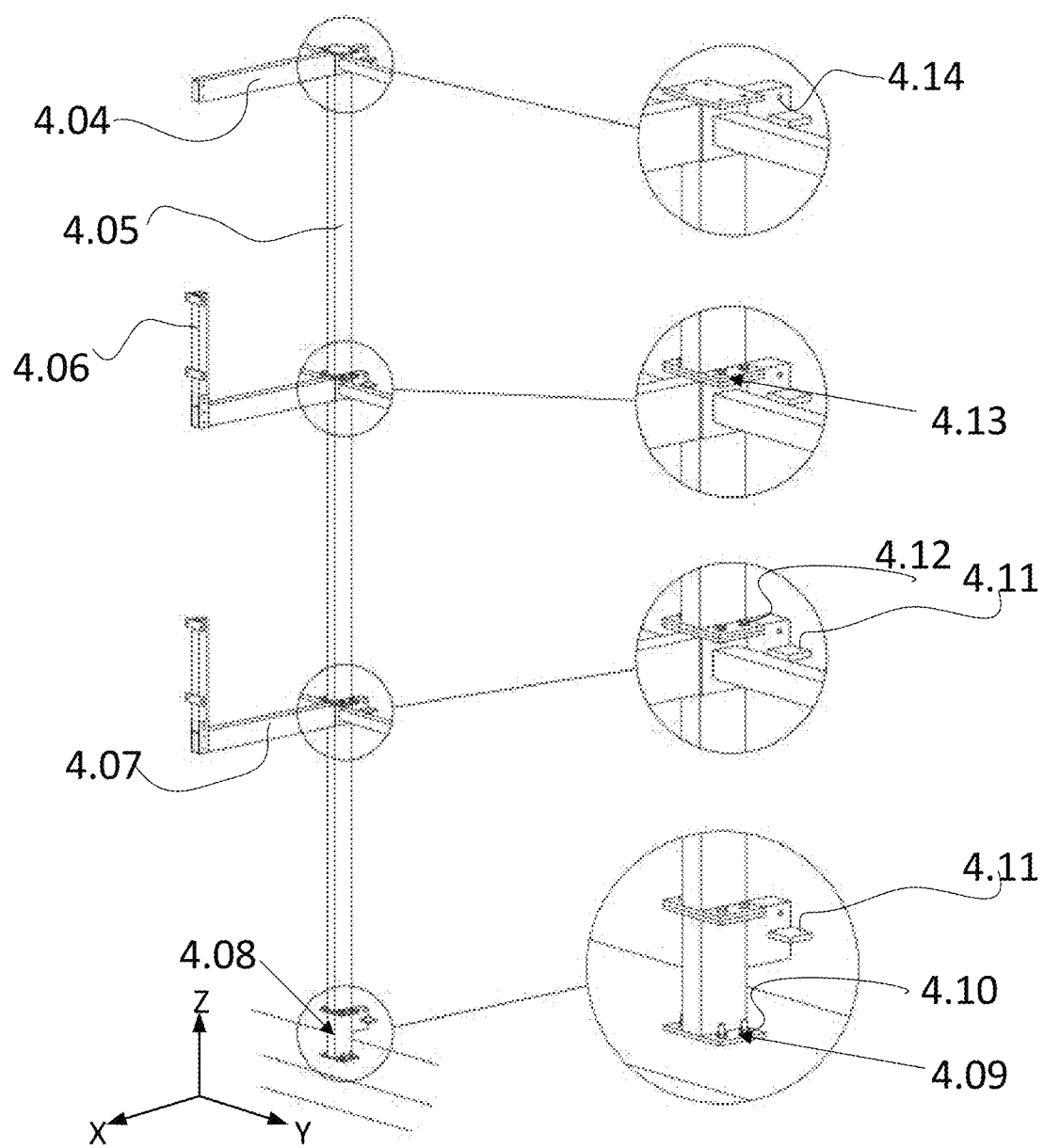
FIG. 7 shows and example of structure details of the vertical columns.
Figure 8:
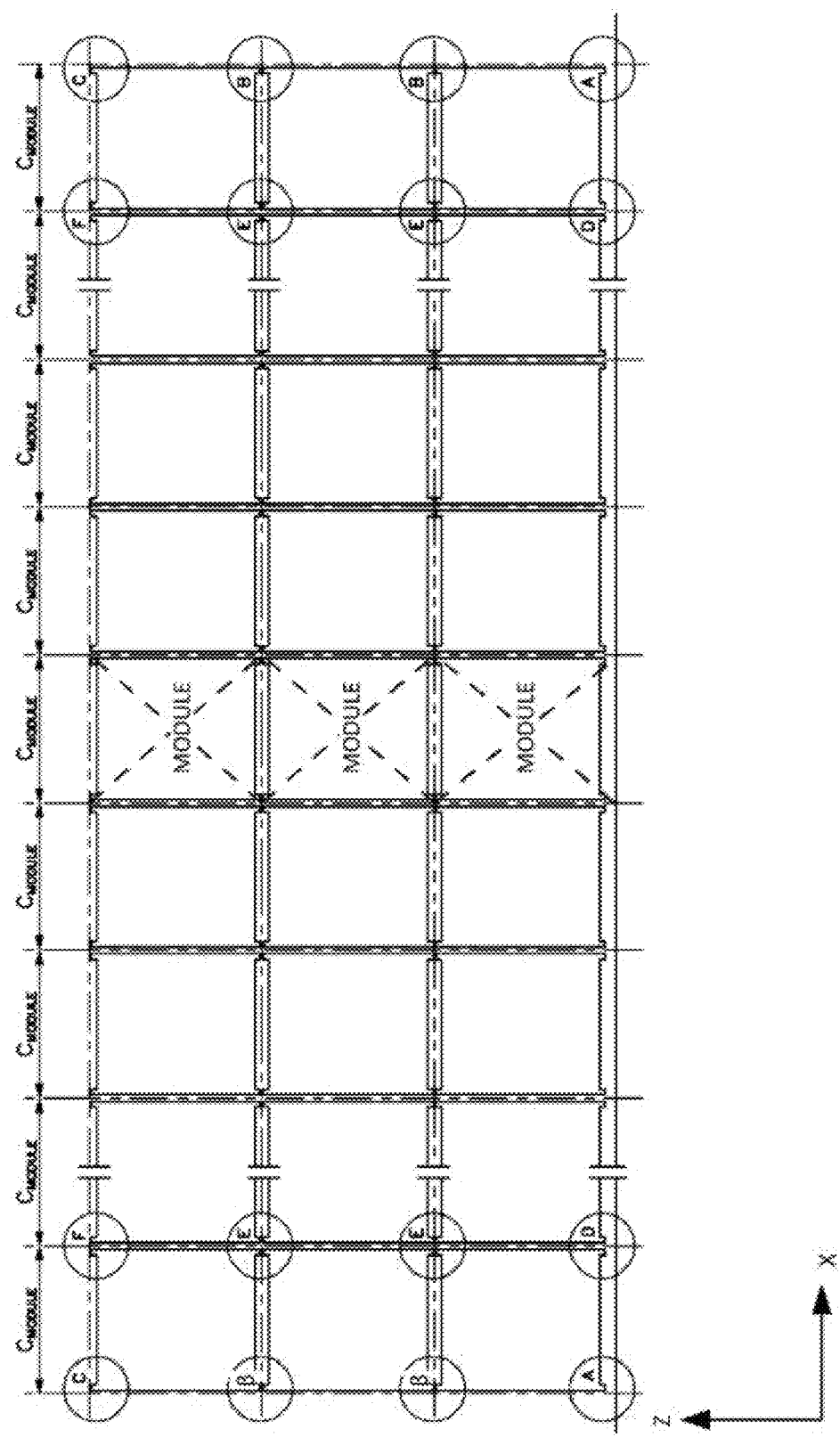
FIG. 8 shows an assembly overview of the modular residential building.

FIG. 7 shows a vertical columns 4.02 in detail. A column 4.02 consists of a first bottom member 4.08. The first bottom member 4.08 is adapted to be anchored to a foundation. At the bottom end the bottom member is provided with a 4.09 base or plate provided with bolt holes. In the figure four bolts 3.06 is shown anchoring the first bottom member 4.08 to a foundation. At the top of the bottom member 4.08 the bottom member is provided with a plate 4.13 provided with a number of bolt holes for bolts. The top plate of the bottom member 4.08 is adapted to be secured with an elongate member 4.05 which has a base/foundation 4.13 with bolt holes. A number of bolts 4.12 secures the elongate member 4.05 to the bottom member 4.08. Several elongate members 4.05 may be stacked on top of each other, each one defines the height H of a floor. As mentioned above the elongate members can be provided with an L-shaped protruding frame structure with a horizontal beam 4.07 and a vertical column 4.06. The horizontal beam 4.07 forms part of a framework which carries the floor of a gallery. The protruding column 4.06 is part of a framework for a railing. The uppermost elongate member 4.05 may be provided with a protruding horizontal beam 4.04 only. This horizontal beam 4.04 can serve as the framework of a roof above the uppermost gallery.

On each uppermost part of the elongate members 4.05 it is provided at least one contact face 4.11 and next to this at least one contact face it is a bolt hole 4.14 in a protruding horizontal part stretching out from the elongate member in the minus Y-direction. The contact surface can be a part of a carrying structure for flat modules. And the bolt hole 4.14 can be used to secure the framework of the flat module 1.0 to the framework/columns 4.02. Columns at the end of a row of columns 4.02, i.e. the columns 4.02 next to the gable wall is not provided with contact surface 4.11 on two sides of its protruding horizontal beam, as there will not be a need to carry flat modules 1.0 on the gable side of the column 4.02.

Foundation:

FIG. 3 shows a view of the foundation for a modular residential building, seen from above i.e. along the Z-axis as well as from the X and Y-direction. The part of the figure which shows two parallel main base plates 3.04 stretching in the Y-direction with two shorter cross members 3.05 stretching in the Y-direction is seen in the Z-direction. The main base plate 3.04 shall carry the weight of the modular residential building, and it serves as the foundation for all the vertical columns 4.02 which carries the flat modules 1.0. In the figure which shows the foundation seen from the Y-direction and the X-direction it is shown an insulation part 3.02 which isolates the part of the building above the foundation from the underground. The insulation 3.02 may be combined with a layer of radon blocking material 3.03.

FIGS. 4a and 4b shows one example of securing means for securing the vertical columns 4.02 to the main base plate 3.04. FIG. 4a shows a bolt configuration including four bolts, whilst FIG. 4b shows the bolt groups 3.06 in detail.

Assembly:

FIG. 8 shows an assembly overview of a modular residential building seen in the Y-direction. Several vertical columns are shown. The columns next to the gable walls differs from those in the middle, moreover as indicate in FIG. 7 the bottom part and the uppermost parts of the columns differs from those in between. In FIG. 8 this is indicated by referring to connection point between elongate members 4.05 using different notations, A, β C, D, E and F.

In FIG. 8 the width of each flat module are shown as "$C_{MODULE}$". In the middle of the figure the central part is shown with dotted crossings.

Figure 9:
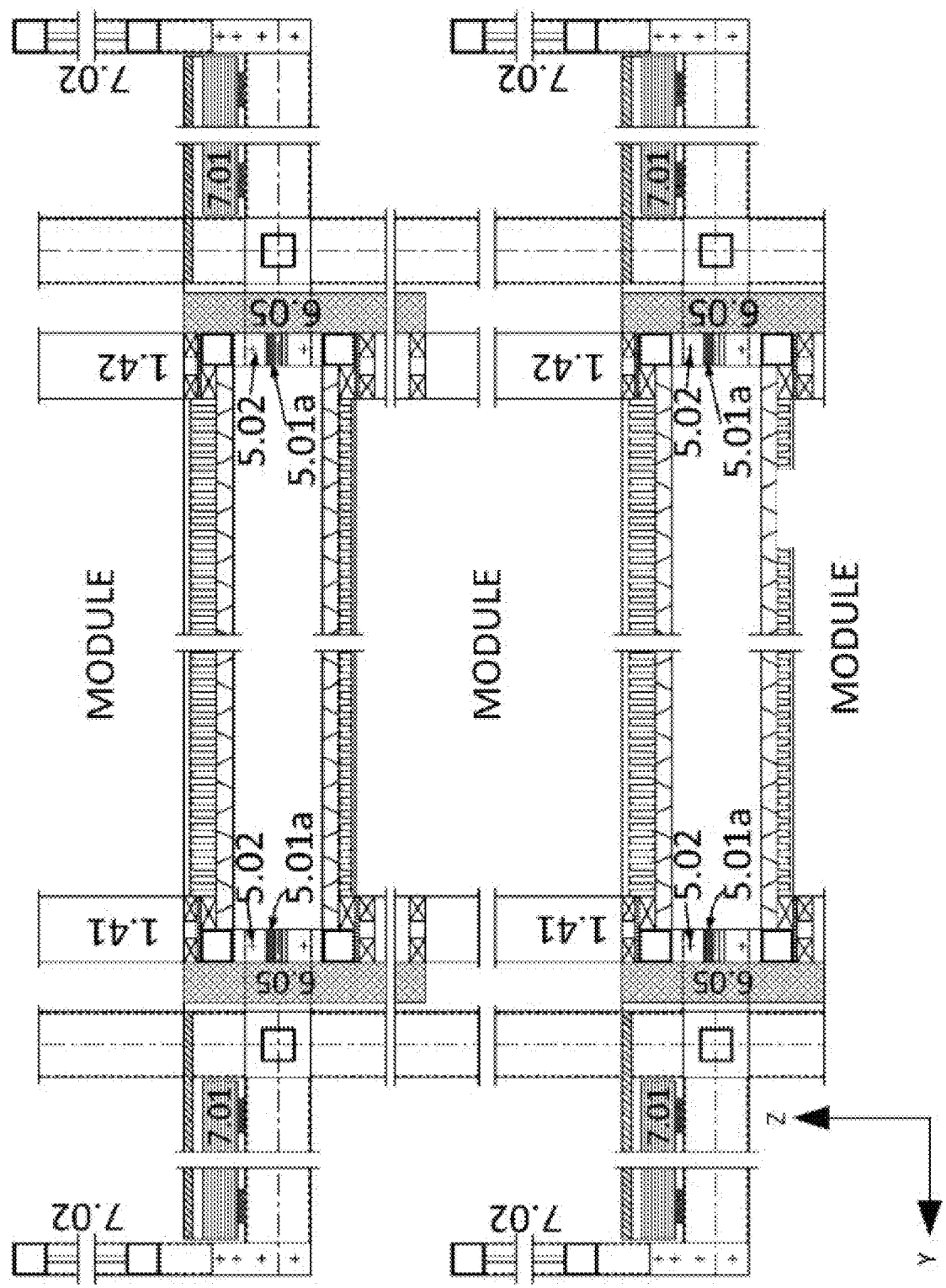
FIG. 9 shows assembly details in cross section of a modular residential building, see in the X-direction.

FIG. 9 shows a modular residential building according to the present invention seen in the X-direction and as a cross sectional view. The figure shows floors between the ground floor and the uppermost floor, i.e. among others galleries 7.01 is included. Seen from the bottom of the figure and in the middle it is indicated a flat module 1.0. The ceiling of the lowermost flat module is shown with insulation. The framework of the flat module itself is indicated ad square black boxes in each of the corners of the flat modules. Between two floors and overlapping downwards it is provided front elements 6.05, these front elements covers the space between two floors in the X-direction, which effectively provides for an internal canal between floors. Fastening bolts 5.02 is shown between neighbouring floors. Sound reduction material 5.01a is provided between building elements. The figure clearly shows the layout of the galleries 7.01 with railings 7.02. Moreover the entrance doors/windows 1.41 and the back door/window 1.42 is shown.

Figure 10A:
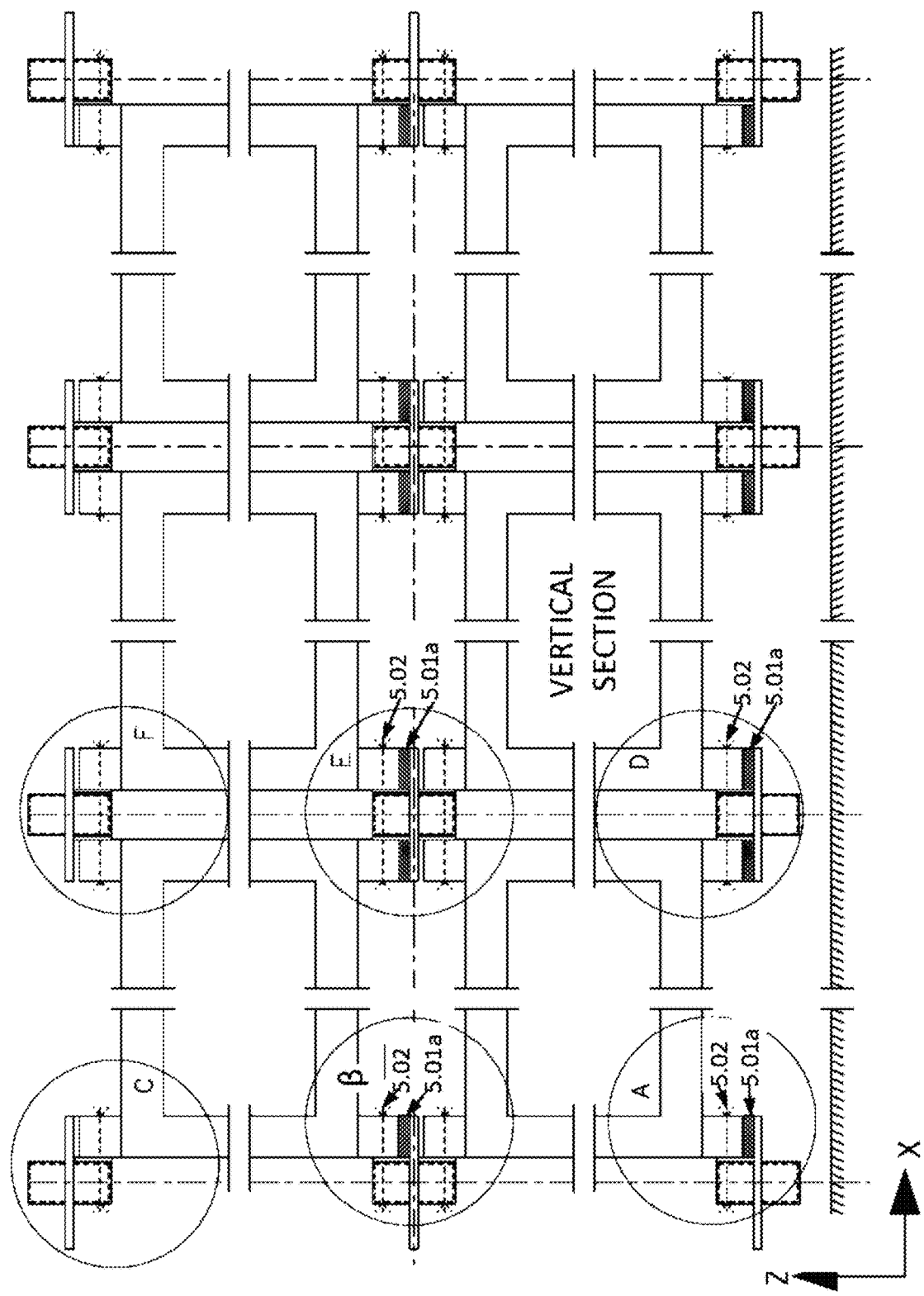
FIG. 10a shows assembly details seen in the Y-direction.

FIG. 10a shows the modular residential building seen in the Y-direction and in a cross sectional view. Bolts 5.02 is seen securing flat modules 1.0 to columns 4.02 through bolt holes 4.14 in the columns 4.02. It clearly appears from the figure that the securing layout differs between the top and the bottom of the building the same applies between the gable end and the flat modules in the middle, this can be identified as A, β, C, D, E and F. Sound reducing material 5.01a is shown.

Figure 10B:
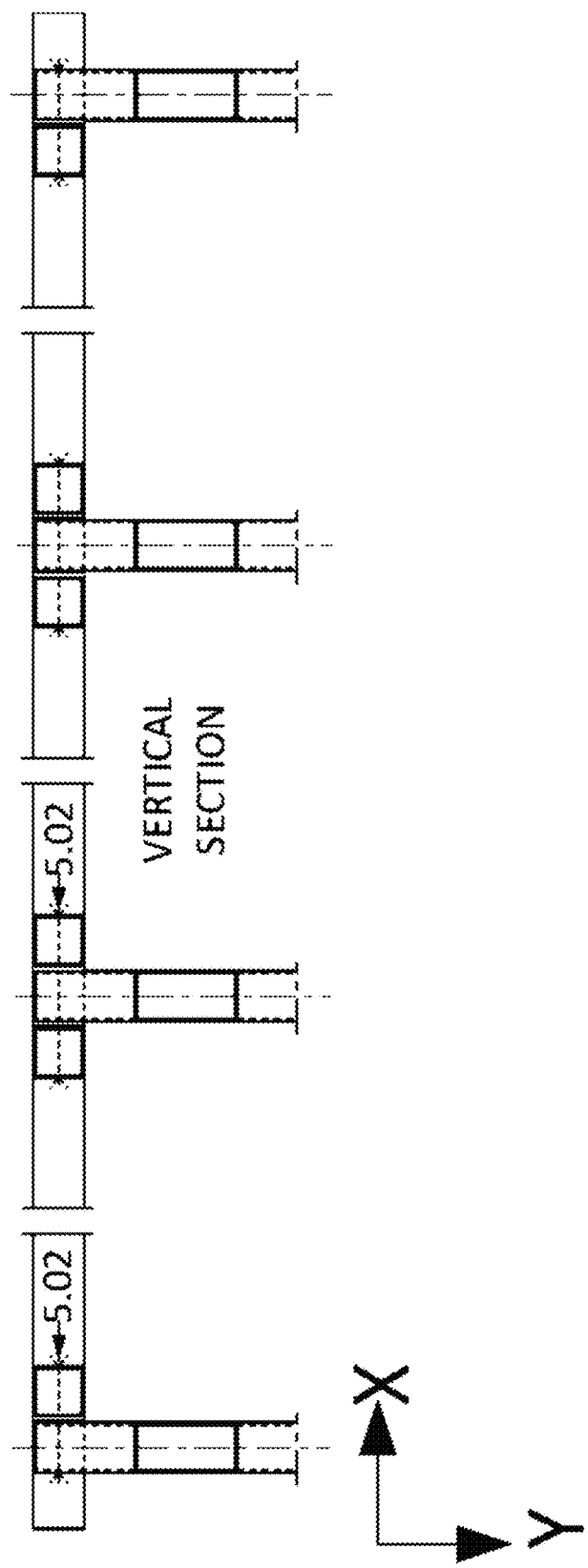
FIG. 10b shows assembly details seen from above, i.e. in the Z-direction.

FIG. 10B shows the assembly seen in the Z-direction. The bolts 5.02 is shown in the figure.

Insulation

Figure 11:
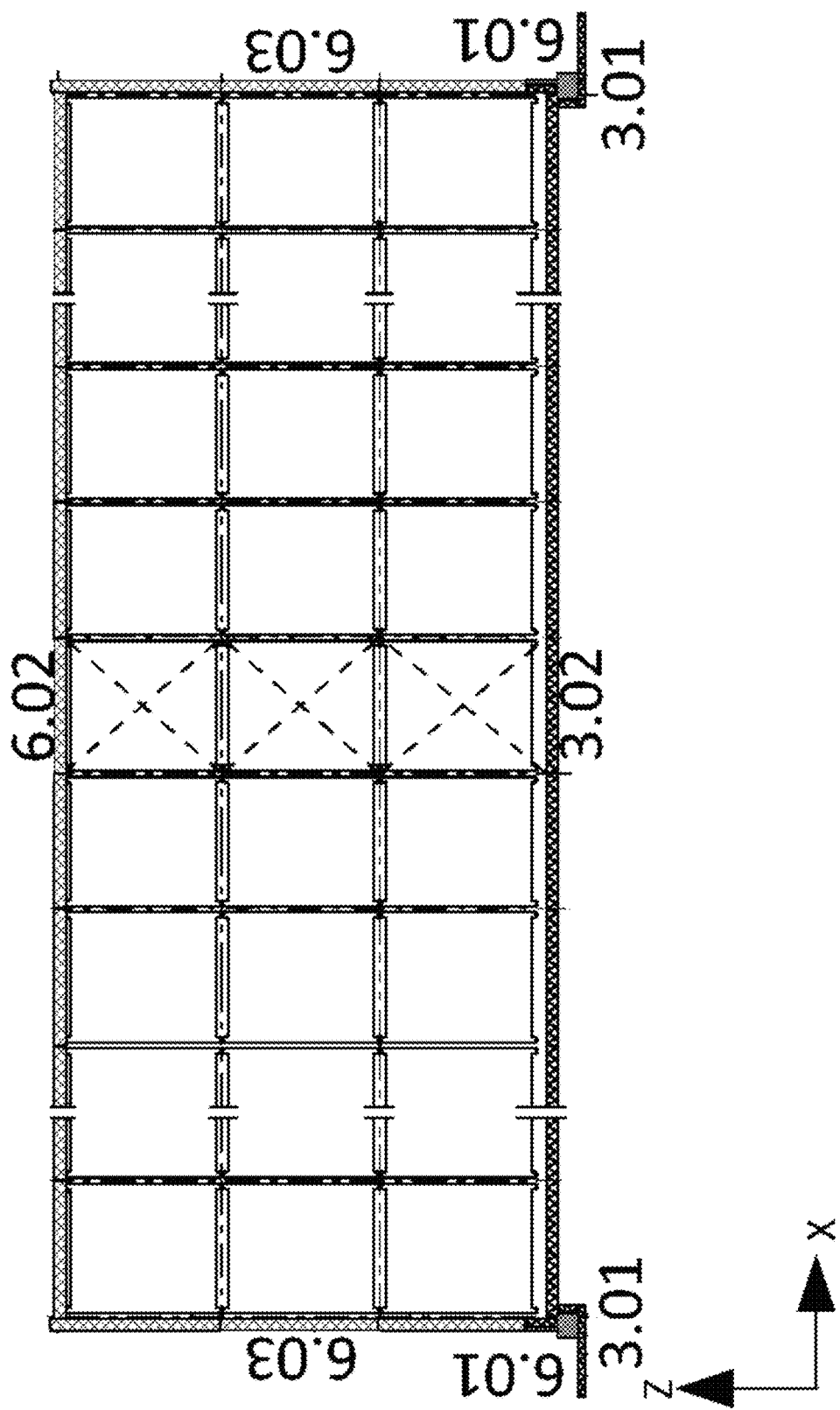
FIG. 11 shows an insulation overview of a modular residential building seen in the Y-direction.

FIG. 11 shows the modular residential building in the Y-direction, i.e. in cross sectional a side view. The building is shown with a roof element 6.02 and with two gable elements 6.03 and with insulation 3.02 at the bottom. Between flat modules 1.0 it is provided canals facilitating circulation of air. The canals are within an outer "shell" created by the gable elements 6.03, the roof element(s) 6.02, the bottom insulation 3.02 and front elements 6.04 which is not shown in FIG. 11. It is shown that different types of insulation can be provided under the flat modules 1.0 and under the ground element 6.01. Typically the insulation 3.01 and 3.02 can be of EPS-type (Expanded PolyStyrene).

Figure 12A:
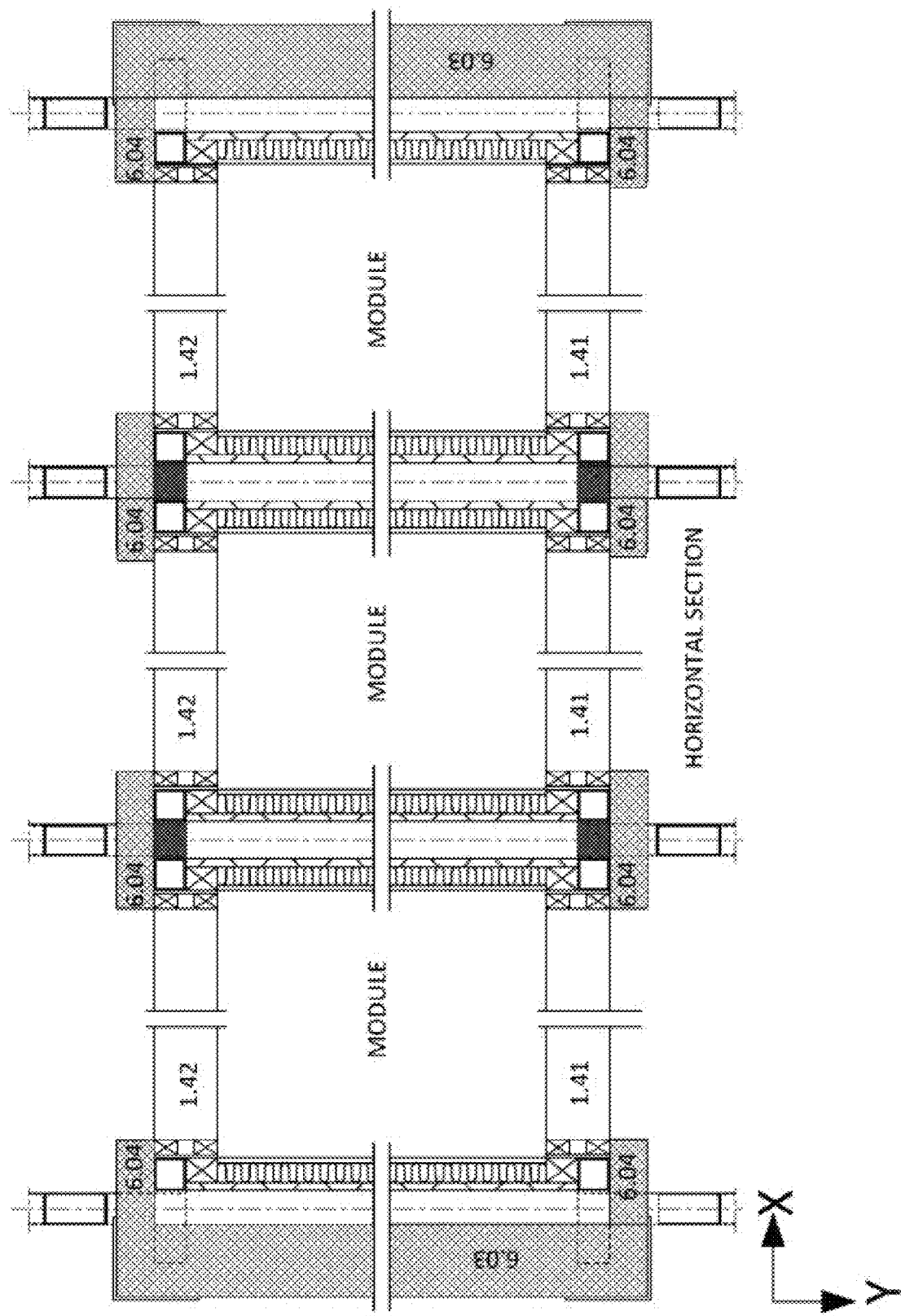
FIG. 12a shows insulation overview of a residential building seen in the Z-direction.

FIG. 12a shows the modular residential building in a Z-direction, that is from above. The galleries can be seen protruding out from the building both from the front and back side. Front elements 6.04 are provided between flat modules and also next to the gable elements 6.03. Front 1.41 and back window/doors 1.42 is shown. The frame work or the columns 4.02 can be seen as quadratic boxes in the corner of each flat module 1.0.

Figure 12B:
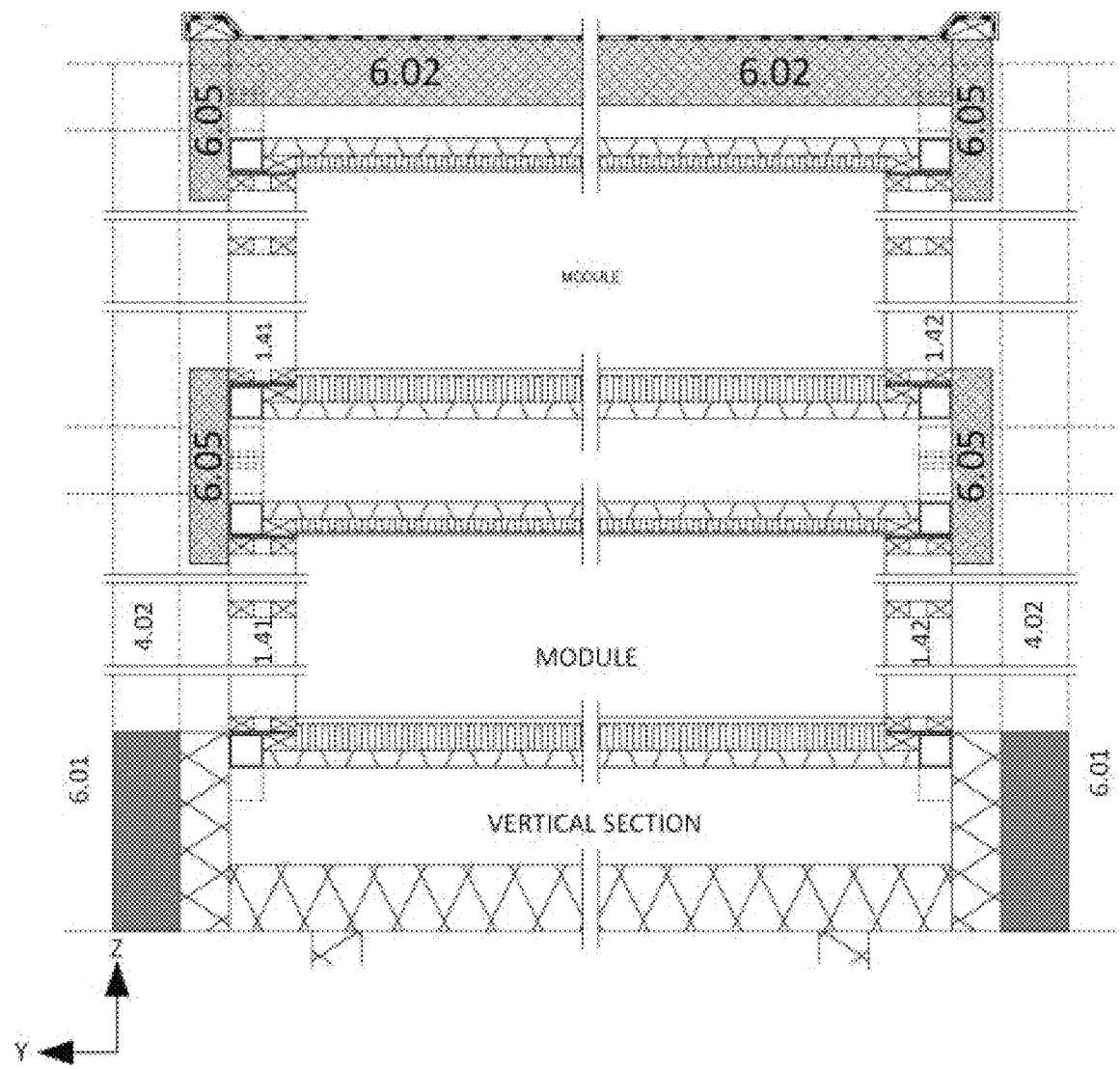
FIG. 12b shows insulation overview of a residential building seen in the X-direction.

FIG. 12b shows the modular residential building seen in the X-direction and as a cross sectional view. Horizontal front elements 6.05 are shown between two floors. The columns 4.02 is indicates as dotted lines. The ground element 6.01 is also shown in the figure. Note that the cavity between two floors can be used as a canal for air, and other technical facilities.

Figure 12C:
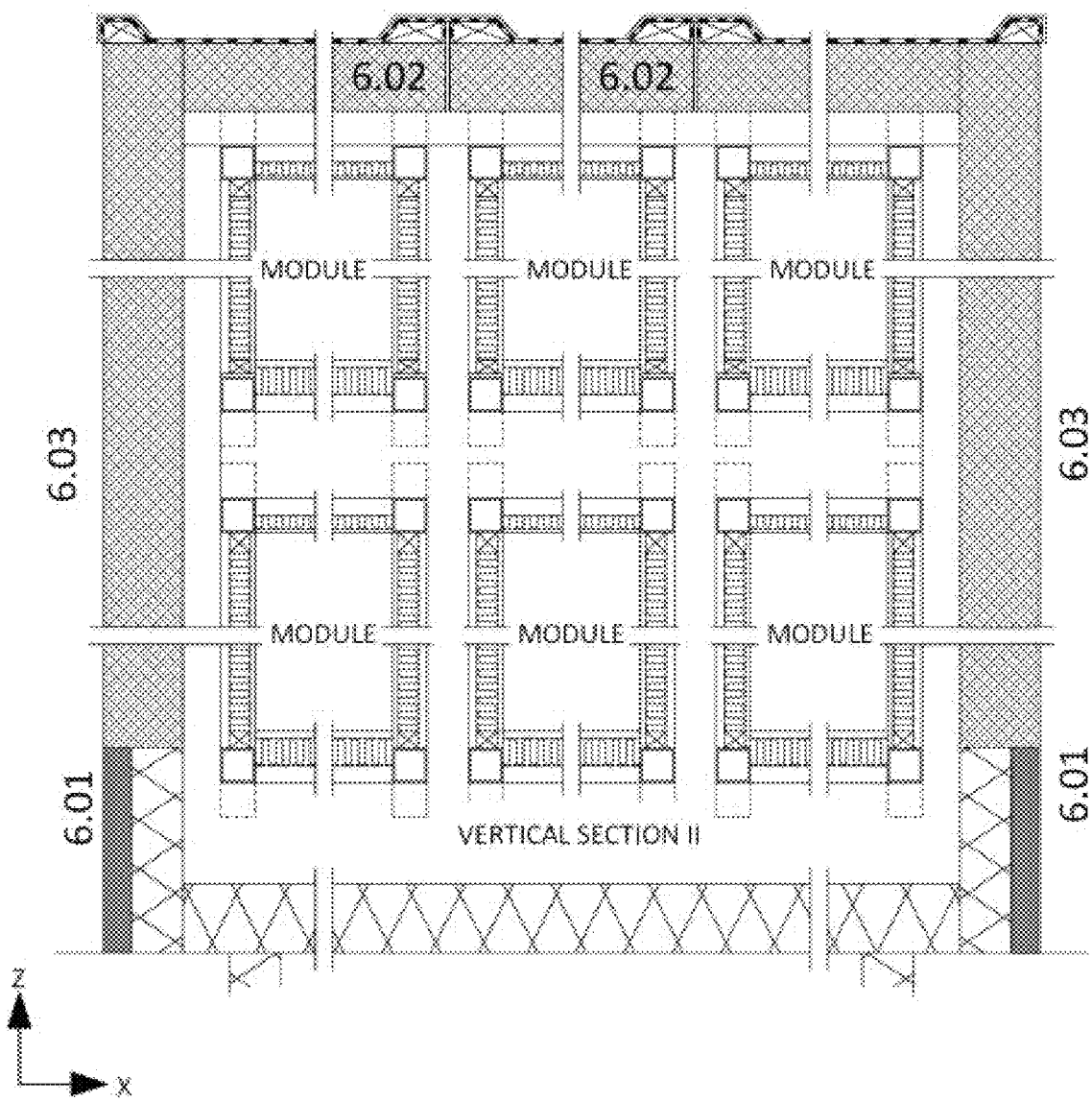
FIG. 12c shows insulation cross section overview of a residential building seen in the Y-direction.

FIG. 12c shows the modular residential building in a cross sectional view seen in the Y-direction. The gable elements 6.03 is seen to the right and left of the building. Roof elements is shown on the top and ground elements 6.01 is shown at the bottom.

Figure 13:
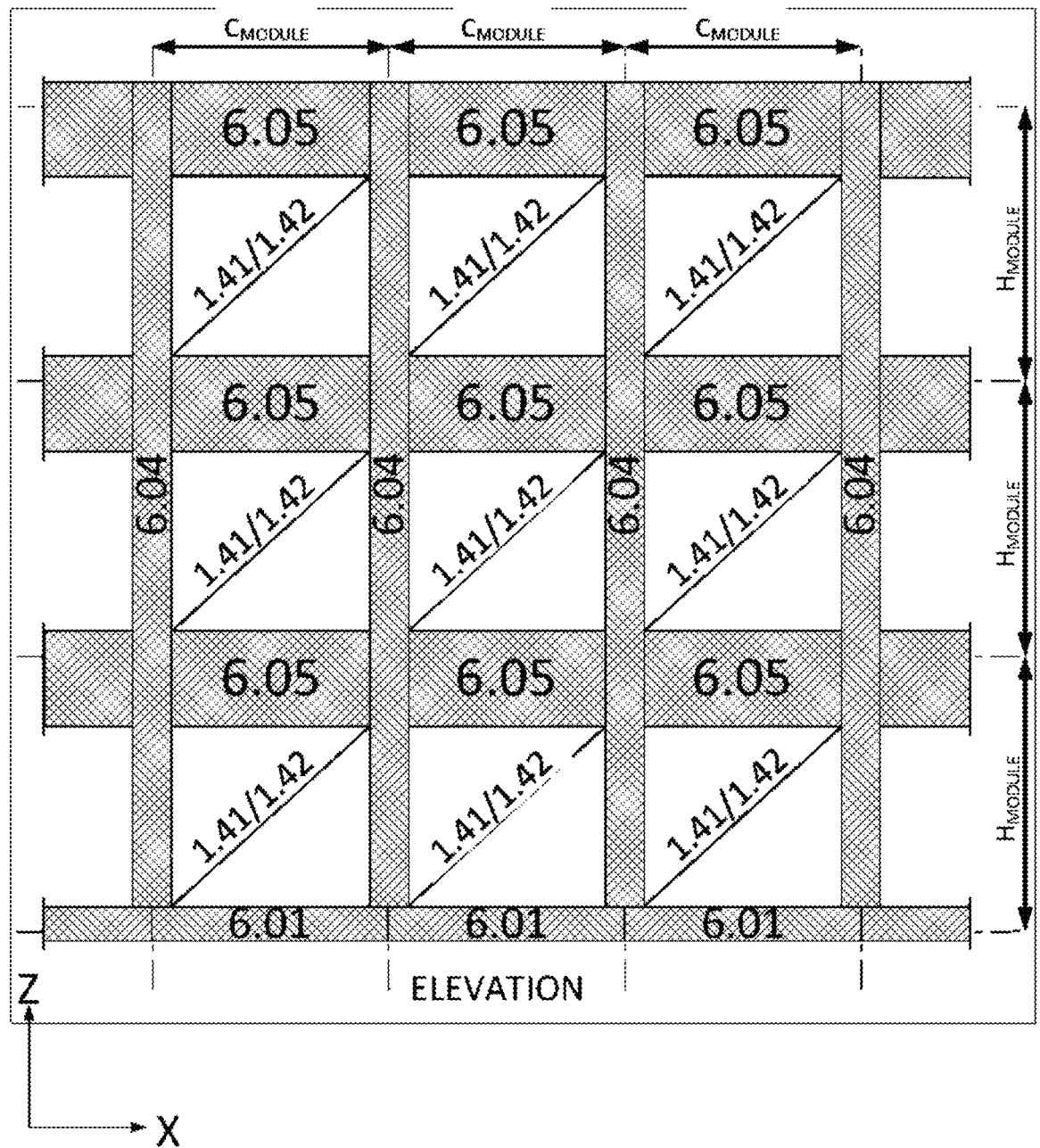
FIG. 13 shows insulation front elements of modular residential building seen in Y-direction.

FIG. 13 shows the insulation front elements of a modular residential building. The building is shown seen in the Y-direction. Horizontal front elements 6.05 and vertical front elements 6.04 is shown. The ground element 6.01 is also shown. The height of a flat module is indicated as $H_{MODULE}$. Examples of relevant U-values and λ-values for insulation elements is given in the table at the end.

Flat Modules

The flat modules 1.0 is illustrated in FIGS. 2a, 2b and 2c. FIG. 2a shows a flat module seen in a Z-direction and as a cross sectional view. The length L of the module is indicated as is the width B of the module. In one aspect of the invention the flat modules are suitable for transportation with a lorry. The flat module can be a modified ISO-container.

In each of the corners of the flat module it is shown part of a container framework 1.01. The framework 1.01 are vertical columns. Between the framework 1.01 and the front 1.41 and back 1.42 window/doors it is provided a sealing 1.43. At the top and bottom of the figure exterior plates 1.31 are shown. The plates 1.31 can be inflammable steel plates. Adjacent the plates 1.31 and in parallel with 1.31 it is provided a layer of insulation. The insulation can be inflammable mineral wool. Adjacent to the insulation layer there is provided an interior plate 1.33. The interior plate appear as one of the interior walls of a flat module 1.0.

FIG. 2b shows a flat module 1.0 in the X-direction, hence the floor elements and roof elements are shown. The figure shows the flat module in a cross sectional view. The length L and the height H of a flat module 1.0 is indicated in the drawing. At the left and the right end of the flat module the door/windows 1.41, 1.42 is shown. The flat module framework 1.01 is here seen in a horizontal direction. A connection 1.02 configured to be secured to bolt holes 4.14 of the vertical columns 4.02 is shown. The ceiling of the flat module 1.0 may comprise an upper exterior plate 1.21 below and adjacent to the upper exterior plate 1.21 it can be provided a layer of insulation 1.22. On the interior side of the flat roof it is provided a ceiling 1.23.

The floor at least comprises a bottom exterior plate 1.11, which can be provided with a layer of insulation 1.12 on top. A floor plate 1.13 can be provided above the layer of insulation. The floor surface can be provided as a final layer of floor covering 1.14.

FIG. 2c shows a cross sectional view of a flat module seen in a Y-direction. The exterior height of the flat is shown as "H", whereas the exterior width of the flat module 1.0 is shown as B.

Protruding out from the framework of the flat modules are connections 1.02. The roof of the flat module may comprise an upper exterior plate 1.21, intermediate layer of insulation 1.22 and a lowermost ceiling 1.23.

The floor comprises at least a bottom exterior plate 1.11, which can be provided with a layer of insulation 1.12 on top. A floor plate 1.13 can be provided above the layer of insulation. The floor surface can be provided as a final layer of floor covering 1.14.

The sidewalls of the flat module at least comprises exterior plates 1.31. Adjacent the plates 1.31 and in parallel with 1.31 it is provided a layer of insulation 1.32. Adjacent to the insulation layer there is provided an interior plate 1.33.

Technical Facilities

FIG. 1b shows a technical overview of the modular residential building according to the present invention.

The building is seen in a cross sectional view in the Y-direction. An outer shell, which is the roof element 6.02, (insulation) and the gable element 6.03 (insulation) is shown. At the bottom of the building it is shown foundation elements end below the foundation elements it is shown supply lines for non-durables such as electricity, 2.03, distant heating 2.04, water 2.05, sewer 2.06 and air 2.07. In the figure it is emphasized that there is a network of canals between the flat modules in the vertical and the horizontal direction. This network of canals is in fact the cavities between flat modules which is closed off at extreme ends by roof elements, gable elements and front elements. A number of vertical shafts 2.02 is shown in the figure.

Example of Interior Layout of Flat Module

Figure 14:
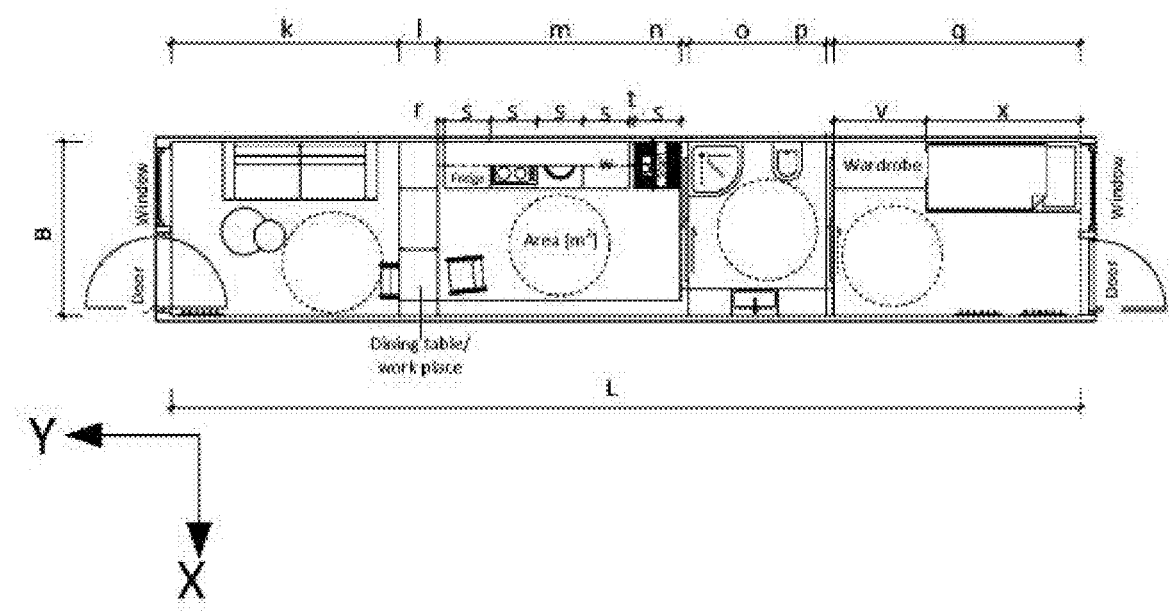
FIG. 14 shows a design example of a flat module.

FIG. 14 shows an example of a layout of a flat module with all amenities necessary for a living.

A First Embodiment of the Present Invention

According to a first embodiment of the invention it is provided a heating and cooling system of a modular residential building. The modular residential building comprises a building framework with vertical columns 4.02 and horizontal beams. The horizontal beams defines the distance between neighbouring vertical columns 4.02. From the front and the back side a row of vertical columns 4.02 stretches in the x-direction with beams between them. The vertical columns can be provided by several elongate members where each elongate member defines the height H between adjacent floors. The vertical columns have means for securing them to the ground, the securing means can be one or more bolts, and in one particular aspect four bolts are used.

Each elongate member is provided with securing means for securing elongate member together, the securing means can be nuts and bolts. In FIG. 4a it is shown four bolts, however other number of bolts may be used and also bolts may be combined with welding, or welding may be used as the only securing means. The elongate members are also provided with means for securing flat modules 1.0 to the building framework. Several flat modules 1.0 can be secured to the framework thereby providing a modular residential block of flats. As indicated above the modular residential building can have several floors, depending on the number of elongate members used in the vertical columns 4.2. The modular residential building is terminated at two of its ends by gable elements 6.03. The ground floor is connected with a ground element 6.01. At least one roof element 6.02 terminates the modular residential building in the z-direction i.e. it is on top of the top floor. Between flat modules 1.0 in neighbouring floors it is provided front elements 6.04. Furthermore as shown in FIGS. 12a and 12b front elements 6.04 can be provided in-between flat modules on the same floor. The flat modules 1.0 can be provided with doors 1.41, 1.42 and windows 1.41, 1.42 at the front 1.41 and/or backside 1.42 of the modular residential building. To make it possible to enter the flat modules the modular residential building is provided with a gallery 7.01 on each floor. In one embodiment the modular residential building is provided with galleries 7.01 both on its front and backside. Obviously one or more stairs are provided between each floor.

As previously mentioned the modular residential building is provided with canals for heating and ventilation of the modules 1.0. In FIG. 1b it is indicated that air 2.07 is distributed in between all modules. The modular residential building is designed with a framework, the framework consists of vertical columns 4.02 (see FIG. 7) and horizontal beams, and where the horizontal beam are oriented in an X-direction. The horizontal beams defines the distance between neighbouring columns. The neighbouring columns are anchored to the ground by fastening means. In FIGS. 7, 4a and 4b four bolts 3.06 are used as anchoring means. The bolts 3.06 are anchored to a main base plate 3.04.

The horizontal and vertical canals for heating and ventilation is provided as cavities between flat modules 1.0. The distances between adjacent flat modules are used ad canals for non-durables such as forced air. The forced air may be given a particular temperature as indicated above. At the gable end, i.e. Y-Z plane, the canals are closed by gable elements 6.03 which includes insulation material, correspondingly the cavities between flat modules are closed off by front elements at the front and back side of the modular residential building. Finally, canals are closed off by one or more roof elements 6.02 and one or more insulation elements between the ground and the ground floor.

The modular residential building has a framework including columns 4.02 in the Z-direction and horizontal beams in the X-direction. The columns 4.02 forms two parallel rows of columns, the distance between the rows are determined by the length L of the flat modules 1.0. Between neighbouring columns in a row it is provided horizontal beams in each floor. The building frameworks includes fastening means (5.02) for securing the flat modules (1.0) to the building framework with a horizontal and vertical distance between neighbouring flat modules (1.0) thereby creating the above mentioned cavities there between where the cavities are utilized as the plurality of horizontal and vertical heating and ventilation canals.

The heating and ventilation system may further comprise at least one technical room (2.01). The technical room is in accordance with one aspect of the first embodiment arranged in the middle of the modular residential building on the ground floor. The technical room can comprise equipment for distribution of non-durables, such as electricity, forced (heated) air, distant heating, water and sewer. In one aspect of the invention the technical room at least comprises one of a fan, a dehumidifier (heat pump) and a reheating battery.

| | |
|---|---|
| 1.0 | Module |
| 1.01 | Frame |
| 1.02 | Connections. Each of the eight corners of the flat modul 1.0 has a protruding block for hoisting, stacking, and securing flat modules |
| 1.11 | Floor, exterior plate, preferably non-flammable |
| 1.12 | Floor, insulation, preferably non-flammable |
| 1.13 | Floor plate |
| 1.14 | Floor covering |
| 1.21 | Exterior plate, roof, preferably non-flammable |
| 1.22 | Insulation, roof, preferably non-flammable |
| 1.23 | Ceiling |
| 1.31 | Exterior plate, long wall, preferably non-flammable |
| 1.32 | Insulation, long wall, preferably non-flammable |
| 1.33 | Interior plate, long wall |
| 1.41 | Door/window (entrance) insulation, preferably non-flammable insulation. $\lambda$ [W/m] can typically be 0.035. Door can have an U-value [$Wm^{-2}K^{-1}$] of 1.0 Window can have an U-value [$Wm^{-2}K^{-1}$] of 1.2 |
| 1.42 | Door/window (sleeping room) insulation, preferably non-flammable insulation. $\lambda$ [W/m] can typically be 0.035. Door can have an U-value [$Wm^{-2}K^{-1}$] of 0.8 Window can have an U-value [$Wm^{-2}K^{-1}$] of 0.8 |
| 1.43 | Sealing |
| 1.51 | Bathroom/doors, division wall |
| 2.0 | Technical facilities |
| 2.01 | Central |
| 2.02 | Shaft |
| 2.03 | Electric cable |
| 2.04 | Distant heating. |
| 2.05 | Water |
| 2.06 | Sewer |
| 2.07 | Air |
| 3.0 | Foundation |
| 3.01 | Insulation, foundation $\lambda$ [W/m] can typically be 0.038. |
| 3.02 | Insulation, foundation $\lambda$ [W/m] can typically be 0.038. |
| 3.03 | Radon block/barrier |
| 3.04 | Main base plate |
| 3.05 | End base plate |
| 3.06 | Bolt groups |
| 4.0 | Structure |
| 4.01 | Anchorage, preferably non-flammable |
| 4.02 | Columns, preferably non-flammable |
| 4.03 | Bracing preferably non-flammable |
| 4.04 | Horizontal gallery roof beam |
| 4.05 | Elongate member of a column 4.02 |
| 4.06 | Vertical column for support of the railing of a gallery 7.01 |
| 4.07 | Horizontal beam for support of the floor of a gallery 7.01 |
| 4.08 | Bottom member of a column 4.02 |
| 4.09 | Base plate of a bottom member 4.08 of a column 4.02 |
| 4.11 | Support face on column members for support of flat modules 1.0 |
| 4.12 | Bolts for connection/securing elongate members 4.05 of columns 4.02 together. |
| 4.13 | Connection plates at top of and bottom of elongate members 4.05. |
| 4.14 | Bolt hole for securing flat modules |
| 5.0 | Assembly |
| 5.01a | Sound reduction, such as Sylodyn |
| 5.01b | Sound reduction, such as Sylomer |
| 5.02 | Fastening bolts |
| 6.0 | Insulation |
| 6.01 | Ground element, $\lambda$ [W/m] can typically be 0.038 |
| 6.02 | Roof element, $\lambda$ [W/m] can typically be 0.035, preferably non-flammable |
| 6.03 | Gable element U [$Wm^{-2}K^{-1}$] can typically be 0.17, preferably non-flammable |
| 6.04 | Front element U [Wm] can typically be 0.32, preferably non-flammable |
| 6.05 | Front element U [$Wm^{-2}K^{-1}$] can typically be 0.32, preferably non-flammable |
| 7.0 | Completions |
| 7.01 | Gallery |
| 7.02 | Railing |
| 7.03 | Stairs |
| H | Exterior height of module 1.0 |
| B | Exterior width of module 1.0 |
| L | Exterior length of module 1.0 |
| A | Fastening configuration of column 4.02 to the main base plate 3.04 next to the gable wall. |
| β | Fastening configuration of column 4.02 to flat modules 1.0 next to the gable wall on floors intermediate ground and top floors |
| C | Fastening configuration of column 4.02 to flat modules 1.0 next to the gable wall on top floor. |
| D | Fastening configuration of column 4.02 to the main base plate 3.04. |
| E | Fastening configuration of column 4.02 to flat modules 1.0 on floors intermediate ground and top floors |
| F | Fastening configuration of column 4.02 to flat modules 1.0 on top floor. |
| k | Measures related to the flat modules 1.0 |
| l | |
| m | |
| n | |
| o | |
| p | |
| q | |
| r | |
| s | |
| t | |
| u | |
| v | |
| W | Shown in figure showing layout of flat, width of kitchen between wall and shaft |
| x | |

The invention claimed is:

1. A modular residential building comprising:
a plurality of container flat modules, each of the container flat modules including a container framework; and
a building framework, wherein the building framework comprises a plurality of vertical columns, each of the vertical columns having a horizontal beam protruding therefrom, the horizontal beam being provided with a plurality of contact surfaces;

wherein the container flat modules has vertically protruding blocks on each of eight corners of the container flat modules to be configured for hoisting, stacking, and securing flat modules, wherein the vertically protruding blocks serve as connection points/securing points between the container flat modules and the building framework for securing the container flat modules to the building framework with a horizontal and vertical distance between neighboring container flat modules, thereby creating cavities therebetween, wherein a plurality of insulating building elements are arranged on the modular residential building to cover the cavities thereby providing enclosed cavities utilized as a plurality of horizontal and vertical heating and cooling canals, wherein the contact surfaces of the horizontal beams are horizontally-disposed planar surfaces configured to support the vertically protruding blocks of the container flat modules, and wherein sound reduction material is provided between each of the contact surfaces of the horizontal beams.

2. The modular residential building according to claim 1, wherein bolts secure the container flat modules to the horizontal beams through bolt holes in the horizontal beams.

3. The modular residential building according to claim 1, wherein the modular residential building further comprises at least one technical room.

4. The modular residential building according to claim 3, wherein the at least one technical room is arranged in the middle of the modular residential building on a ground floor.

5. The modular residential building according to claim 4, wherein the at least one technical room comprises at least one of a fan, a dehumidifier, and a reheating battery.

6. The modular residential building according to claim 1, wherein the plurality of insulating building elements comprises:
   at least two gable elements;
   a plurality of vertical front elements that are each elongated along a vertical axis;
   a plurality of horizontal front elements that are each elongated along a horizontal axis; and
   at least one roof element that extends over a roof to at least two of the container flat modules.

7. The modular residential building according to claim 6, wherein the horizontal and vertical heating and cooling canals are within an outer shell created by the at least two gable elements, the at least one roof element, insulation at a bottom of the modular residential building, and the vertical front elements.

8. The modular residential building according to claim 6, wherein the horizontal front elements are provided between two adjacent floors of a plurality of floors of the modular residential building and overlap in a downward direction, and the horizontal front elements cover a space between the two adjacent floors along the horizontal axis, which effectively provides for an internal canal between the two adjacent floors.

9. The modular residential building according to claim 1, wherein the plurality of insulating building elements further comprises at least one ground element.

10. The modular residential building according to claim 1, wherein the vertically protruding blocks on each of the eight corners of the container flat modules provide for a distance between the building framework and a main part of the container flat modules and between neighboring container flat modules.

11. The modular residential building according to claim 1, wherein each vertical column of the building framework comprises:
   a bottom member having a base plate provided with bolt holes at a bottom end of the bottom member and a top plate provided with bolt holes at a top end of the bottom member, wherein the base plate is adapted to be anchored to a main base plate that is a part of a foundation of the modular residential building with bolts via the bolt holes; and
   a plurality of elongate members stacked on top of each other, each elongate member having a base plate provided with bolt holes at a bottom end of the elongate member and a top plate provided with bolt holes at a top end of the elongate member,
   wherein the base plate of a lowermost elongate member is adapted to be secured to the top plate of the bottom member with bolts via the bolt holes,
   wherein each elongate member defines a height of a floor of the modular residential building, and
   wherein a number of the elongate members defines a number of floors of the modular residential building.

12. The modular residential building according to claim 11, wherein:
   the elongate members, other than an uppermost elongate member, of the vertical columns of the building framework are provided with an L-shaped protruding frame structure including a horizontal beam protruding from the top end of the elongate members and a vertical column protruding from the horizontal beam; and
   the uppermost elongate member of the vertical columns of the building framework is provided with a horizontal beam protruding from the top end of the uppermost elongate member,
   wherein each horizontal beam defines a distance between neighboring vertical columns.

13. The modular residential building according to claim 12, wherein:
   the elongate members of the vertical columns of the building framework are provided with a horizontal part protruding from the top end of the elongate members in a direction opposite the horizontal beam, wherein the horizontal part includes at least one of the contact surfaces and at least one bolt hole; and
   the protruding blocks of the container flat modules are adapted to be secured to the horizontal part of the elongate members with a bolt via the bolt hole, and supported by the contact surfaces of the horizontal part of the elongate members.

14. A modular residential building comprising:
   a building framework, wherein the building framework comprises a plurality of vertical columns, each of the vertical columns having a horizontal beam protruding therefrom, the horizontal beam being provided with a plurality of contact surfaces;
   a plurality of standalone container flat modules, each of the standalone container flat modules including a container framework;
   wherein the contact surfaces of the vertical columns are a part of a carrying structure for the standalone container flat modules,
   wherein each of eight corners of the standalone container flat modules has a vertically protruding block to be configured for hoisting, stacking, and securing the standalone container flat modules to the building framework, wherein the vertically protruding blocks includes horizontal bolt holes serving to secure the standalone container flat modules through horizontal bolt holes in the horizontal beams protruding from the vertical columns of the building framework using a bolt;

wherein the contact surfaces of the horizontal beams are horizontally-disposed planar surfaces protruding horizontally from the horizontal beam and being configured to support the vertically protruding blocks, and wherein sound reduction material is provided between each of the contact surfaces of the horizontal beams and the standalone container flat module.

15. The modular residential building according to claim 14, wherein each vertical column creating the assembly of the building framework comprises:

a bottom member having a base plate provided with bolt holes at a bottom end of the bottom member and a top plate provided with bolt holes at a top end of the bottom member, wherein the base plate is adapted to be anchored to a main base plate that is a part of a foundation of the modular residential building with bolts via the bolt holes; and a plurality of elongate members stacked on top of each other, each elongate member having a base plate provided with bolt holes at a bottom end of the elongate member and a top plate provided with bolt holes at a top end of the elongate member, wherein the base plate of a lowermost elongate member is adapted to be secured to the top plate of the bottom member with bolts via the bolt holes, wherein each elongate member defines a height of a floor of the modular residential building, and wherein a number of the elongate members defines a number of floors of the modular residential building.

16. The modular residential building according to claim 15, wherein:

the elongate members, other than an uppermost elongate member, of the vertical columns of the building framework are provided with an L-shaped protruding frame structure including a horizontal beam protruding from the top end of the elongate members and a vertical column protruding from the horizontal beam; and the uppermost elongate member of the vertical columns of the building framework is provided with a horizontal beam protruding from the top end of the uppermost elongate member, wherein each horizontal beam defines a distance between neighboring vertical columns.

17. The modular residential building according to claim 16, wherein:

the elongate members of the vertical columns of the building framework are provided with a horizontal part protruding from the top end of the elongate members in a direction opposite the horizontal beam, wherein the horizontal part includes at least one of the contact surfaces and at least one bolt hole; and the protruding blocks of the standalone container flat modules are adapted to be secured to the horizontal part of the elongate members with a bolt via the bolt hole, and supported by the contact surfaces of the horizontal part of the elongate members.

* * * * *